(12) United States Patent
Pitwon

(10) Patent No.: US 8,737,777 B2
(45) Date of Patent: May 27, 2014

(54) OPTICAL WAVEGUIDE AND A METHOD FOR MAKING AN OPTICAL WAVEGUIDE

(75) Inventor: Richard C. A. Pitwon, Fareham (GB)

(73) Assignee: Xyratex Technology Limited, Havant (GB)

( * ) Notice: Subject to any disclaimer, the term of this patent is extended or adjusted under 35 U.S.C. 154(b) by 142 days.

(21) Appl. No.: 13/342,569

(22) Filed: Jan. 3, 2012

(65) Prior Publication Data

US 2013/0170802 A1 Jul. 4, 2013

(51) Int. Cl.
*G02B 6/26* (2006.01)
*G02B 6/42* (2006.01)

(52) U.S. Cl.
USPC .......................................................... 385/32

(58) Field of Classification Search
USPC ............................................................. 385/32
See application file for complete search history.

(56) References Cited

U.S. PATENT DOCUMENTS

| | | | |
|---|---|---|---|
| 5,018,811 A | 5/1991 | Haavisto et al. | |
| 7,776,236 B2 | 8/2010 | Shih et al. | |
| 7,876,495 B1 * | 1/2011 | Minelly | 359/341.1 |
| 7,924,500 B1 * | 4/2011 | Minelly | 359/341.1 |
| 8,270,787 B2 * | 9/2012 | Sumetsky | 385/28 |
| 2005/0053346 A1 * | 3/2005 | Deng et al. | 385/129 |
| 2005/0254761 A1 * | 11/2005 | Tammela | 385/123 |
| 2007/0147751 A1 | 6/2007 | Fini | |
| 2008/0025363 A1 * | 1/2008 | Yla-jarkko et al. | 372/98 |
| 2008/0112664 A1 * | 5/2008 | Lee et al. | 385/1 |
| 2009/0218519 A1 | 9/2009 | McLeod | |

FOREIGN PATENT DOCUMENTS

| | | |
|---|---|---|
| WO | 03/065095 | 8/2003 |
| WO | 2012/075509 | 6/2012 |

OTHER PUBLICATIONS

Mordehai Heiblum et al., "Analysis of Curved Optical Waveguides by Conformal Transformation," IEEE Journal of Quantum Electronics, vol. QE-11, No. 2, pp. 75-83 (Feb. 1975).
Meint K. Smit et al., "A Normalized Approach to the Design of Low-Loss Optical Waveguide Bends," Journal of Lightwave Technology, vol. 11, No. 11, pp. 1737-1742 (Nov. 1993).
William Berglund et al., "WKB Analysis of Bend Losses in Optical Waveguides," Journal of Lightwave Technology, vol. 18, No. 8, pp. 1161-1166 (Aug. 2000).
Great Britain Office Action dated Mar. 20, 2013 in corresponding Great Britain Patent Application No. GB1221905.1.

* cited by examiner

*Primary Examiner* — Ryan Lepisto
(74) *Attorney, Agent, or Firm* — Pillsbury Winthrop Shaw Pittman LLP

(57) ABSTRACT

The invention provides an optical waveguide and a method of making an optical waveguide. The waveguide has a curved section having an asymmetric refractive index profile, in which the refractive index varies asymmetrically across the waveguide cross-section in dependence on the radius of the curved section of the waveguide.

41 Claims, 24 Drawing Sheets

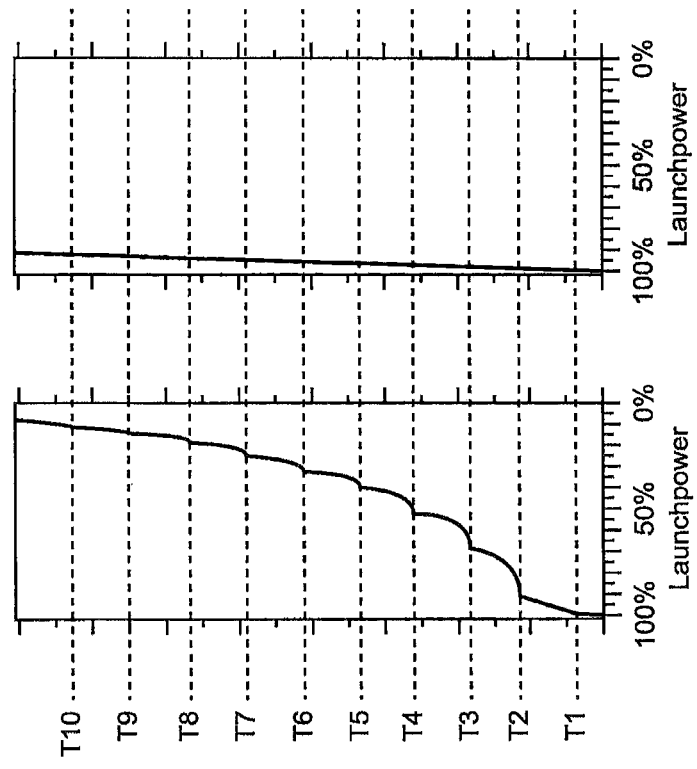
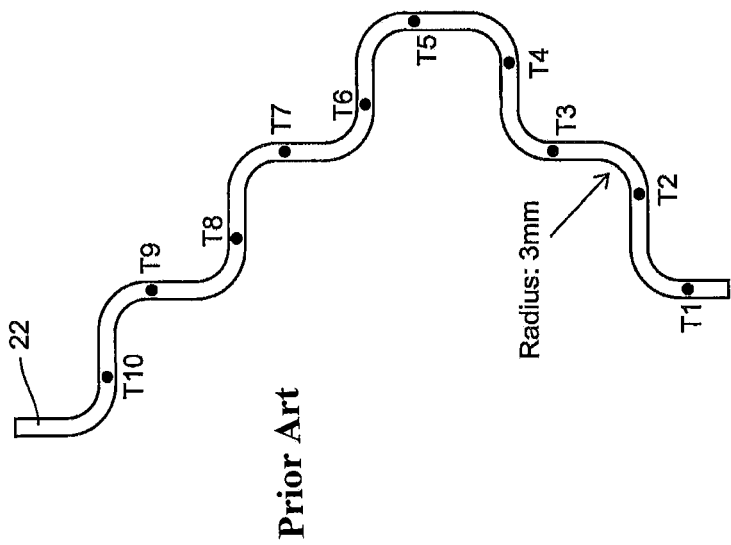
Fig. 3A Prior Art
Fig. 3B Prior Art
Fig. 3C Prior Art

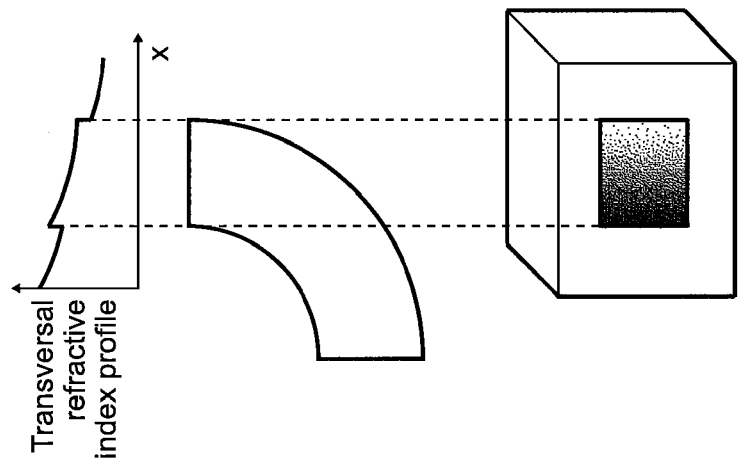
Fig. 10C
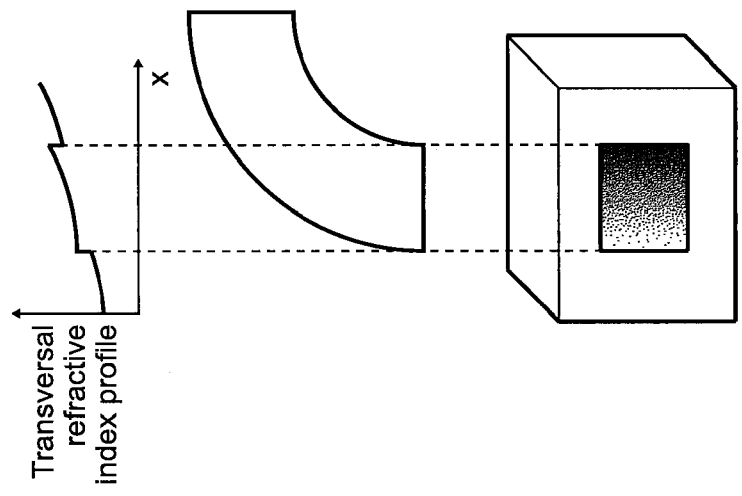
Fig. 10B
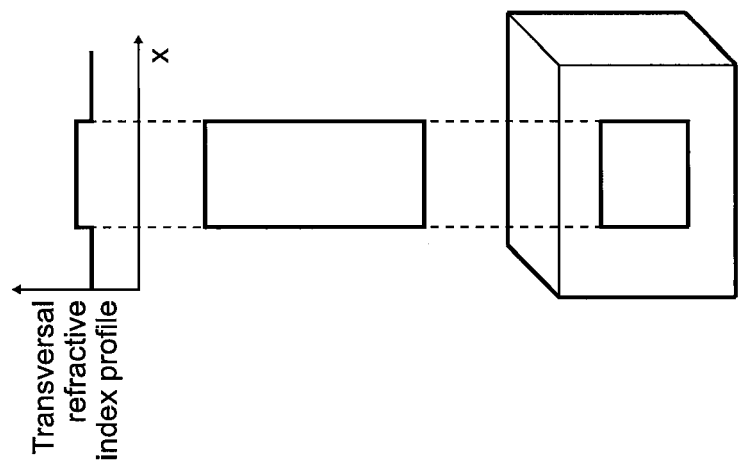
Fig. 10A
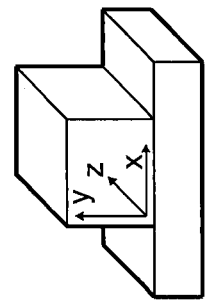

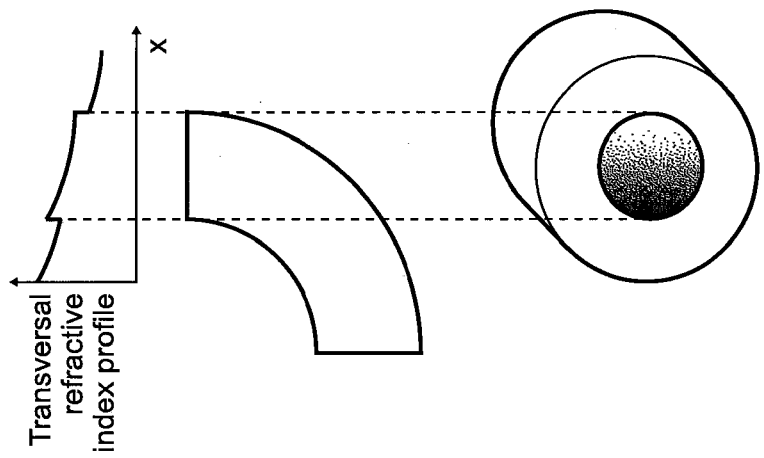
Fig. 10F
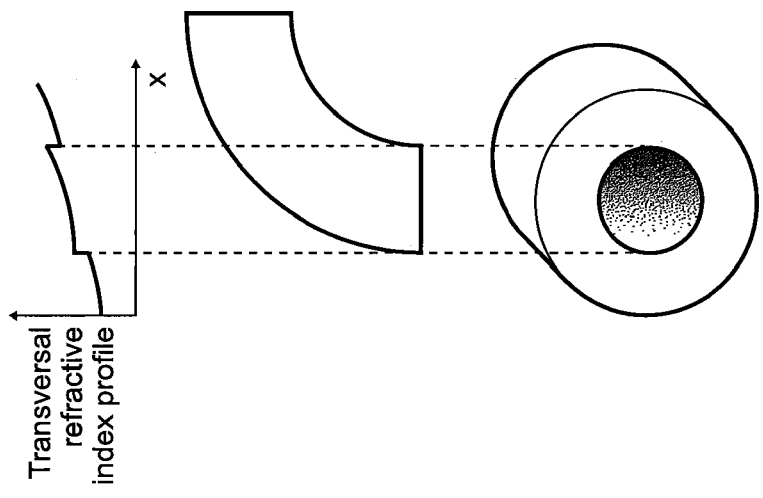
Fig. 10E
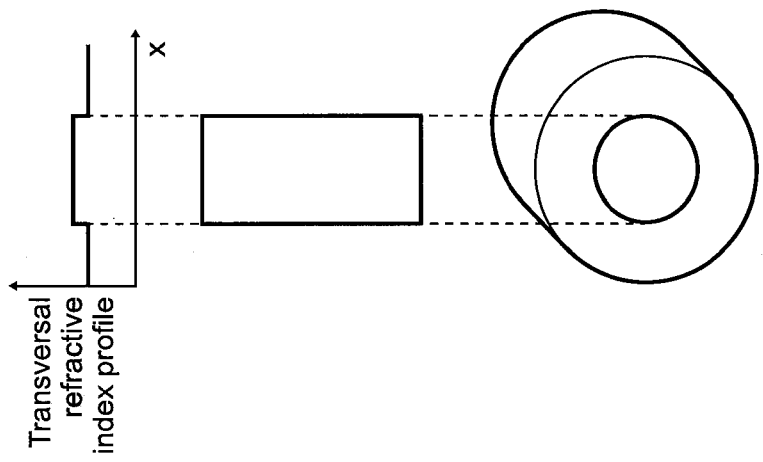
Fig. 10D
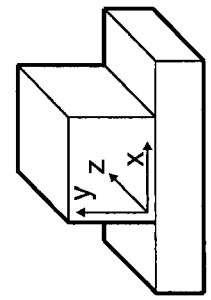

OPTICAL WAVEGUIDE AND A METHOD FOR MAKING AN OPTICAL WAVEGUIDE

The present invention relates to an optical waveguide and a method for making an optical waveguide.

In embodiments, the invention may relate to planar optical channels including optical glass or polymer fibres and glass or polymer waveguides. As used herein the term "waveguide" simply means some type of formed channel or member for carrying an optical signal.

As data rates increase in data communication systems, the deployment of embedded optical communications channels on printed circuit boards within the system is increasingly being considered due to their inherently higher bandwidth capacity as compared to conventional copper channels. One problem that exists with the use of optical channels on printed circuit boards (PCBs) relates to optical bend transition loss which is the loss of signal power which occurs when the radius of curvature of a waveguide changes along its axis. This effect is strongest when the radius of curvature is suddenly reduced along the course of a waveguide, such as when an optical signal propagates from a straight waveguide segment to a bent or curved segment. Indeed, it has been recognised that optical bend transition loss is amongst the largest loss mechanisms on planar optical channels. It therefore is a significant factor in restricting the design of optical waveguides in terms of the trade-off between the number of bends or curves, radius of curvature of bends and the length of the waveguide.

Indeed, in spite of the substantial design benefits associated with embedded optical waveguides, the severe constriction of minimum bend radius in the plane of the interconnect layer has yet to be overcome. Characterisation of optical propagation losses in printed multimode polymer waveguides has shown that in-plane bend losses due to bend transition loss and scattering of higher order modes will typically restrict the in-plane bend radius to more than 15 mm. In practical terms, it would be very difficult and severely limiting to accommodate a bend radius that large within a high density optical PCB interconnect layout. In effect, in-plane bend transition loss is a technology inhibitor for embedded planar optical waveguides.

FIG. 1 shows a schematic representation of a waveguide core 2 surrounded by cladding 4. The waveguide core 2 comprises a straight section 6 followed by a curved section 8. FIG. 1 also includes schematic views 10 and 11 of a supported fundamental optical mode of an optical signal propagating along the straight waveguide section and higher order modes of an optical signal propagating along the bent waveguide section respectively. As can be seen, in the straight section 6, the mode 10 propagates through the centre of the waveguide core. As the optical signal continues into the curved section the optical signal energy is transferred from the fundamental mode to the higher order mode(s) 11 along the outer bend region. In effect, the mode 10 is forced into the outer region of the curved waveguide core such that it is $n_o$ longer supported centrally. This transfer of the optical signal energy in mode 10 from the centre of the core to higher order modes in a different outer region thereof is the same effect as would occur if the waveguide remained straight but the refractive index profile varied asymmetrically as shown in graph 14.

Accordingly, waveguides with bends can be modelled as straight waveguides with a transverse (cross-sectional) refractive index profile that varies asymmetrically across the waveguide cross-section (in a plane normal to the axis of the waveguide). Every time there is a change in waveguide curvature, i.e. a change in bend radius of the waveguide in the plane of the PCB, there is a change in the boundary conditions of the waveguide causing the supported optical mode profile (those modes that can be supported by the immediate boundary conditions) to change accordingly. This has the deleterious effect that the mismatches in supportable mode profiles between sections with different radii cause optical loss when optical energy propagates from a first section to a second section wherein some of the modes supported in the first section are no longer supported in the second section. For example, to consider the problem from an optical ray point of view, when an optical signal transitions from a straight waveguide section to a bent waveguide section, a fraction of the signal energy is expelled as the angles formed by some of the light rays with the waveguide boundary are no longer at or below the critical angle required to satisfy the conditions for total internal reflection within the waveguide. This is known as the bend transition loss. Accordingly any reduction in the radius of curvature along the waveguide typically gives rise to a leakage of optical energy from the waveguide.

Referring again to FIG. 1, the effective refractive index profile for the waveguide core of a conventional step-index waveguide is shown for the straight section 12 and the curved section 14. The actual transversal refractive index for the whole waveguide is step-index (identical to 12). However bent waveguide segments with a step-index profile behave in the same way as straight waveguide segments with an asymmetric refractive index profile through the application of conformal transformations as will be discussed below. In FIG. 1 the effective index profiles 12 and 14 represent the transverse refractive index profiles that would be required on a purely straight waveguide for it to behave like the waveguide shown. It can be seen that the effective refractive index profile for a straight waveguide segment is the same as its real refractive index profile as the transformation required to map a straight waveguide to a straight waveguide is simply 1:1.

As can be seen, for the straight section 6, the refractive index profile is a flat step-index profile in which the refractive index of the waveguide core ($n_{core}$) is constant across the transverse width of the waveguide core and the refractive index of the cladding ($n_{cladding}$) is constant either side of the waveguide core. In the curved section 8 although there has been no physical change in the material properties of the waveguide core and therefore the actual transversal refractive index profile of the material across the core is still the same as in the straight section, because the supportable mode profile 11 has changed, this can be modelled as an asymmetric perturbation in transversal refractive index. In other words there is a refractive index profile 14 that if applied to a straight waveguide would give rise to the mode profile shown in 11.

The number of bends that can be introduced in a waveguide is also limited since if more than a certain number are introduced then the cumulative effect of bend losses can reduce the quality and power of the signal to a level which is unacceptable for reliable data transfer. In addition, the bend radii that can be applied to embedded optical channels are also subject to constraints since the smaller the bend radius, the higher the bend loss. Such restrictions are clearly undesirable and naturally impact on the use of embedded optical channels in high density electro-optical PCBs in data communication systems such as rack scale data storage, high performance computing or supercomputing systems.

FIG. 2 shows a similar view to that of FIG. 1 except in this case the waveguide has a typical graded-index profile, whereby the refractive index of the core varies parabolically across the core and symmetrically around the centre of the core. However, graded index waveguides can also be prone to transition losses when there is a sudden reduction in bend radius, though to a lesser degree than conventional step-index waveguides. A transfer of modal energy from lower order (central) modes to higher order modes can be observed when a signal transfers from a straight section 16 to a curved section 18.

Again, the asymmetric refractive index perturbation 20 shown represents the effective refractive index profile that would need to be applied to a purely straight waveguide to enable it to behave like the waveguide shown with a conventional graded index profile throughout.

FIG. 3A shows a schematic representation of waveguide 22 having multiple straight and curved sections, whereby each curved section has a radius of curvature of 3 mm or −3 mm. At each of the points numbered T1 to T10 there is a sudden reduction in radius of curvature of the waveguide, the reduction comprising a transition from a straight waveguide section to a curved section or from a curved section to an oppositely curved section (known as a waveguide inflection point). FIG. 3B shows the simulation results for propagating optical signal energy within the waveguide 22, the waveguide having a step-index profile throughout. It can be seen that at each bend transition point T1 to T10, there is a sudden loss of a fraction of the signal energy as light is expelled from the waveguide. By the time the signal has propagated along the entire length of the waveguide 22, the signal strength has been reduced to below 10% of the input power level.

FIGS. 4A and 4B show a schematic representation of a curved waveguide 19. The waveguide 19 is continuous but is shown being made up of plural sections 21A, 21B etc. Some of the sections 21A and 21C etc are straight, and others 21B and 21D etc are curved. In FIG. 5, a propagating optical signal 23 is shown. As can be seen as the signal 23 passes from a straight section 21A to a curved section 21B, a proportion 25 of the signal is expelled for the reasons explained above. Typically there is little loss when the signal passes from a curved section back to a straight section.

In the article entitled "Analysis of Curved Optical Waveguides by Conformal Transformation" by Heiblum et al, published in IEEE Journal of Quantum Electronics, Vol QE-11, No. 2 Feb. 1975 there is disclosed a method of conformal transformations applied to the analysis of waveguide bends. This is described in greater detail in the annex to the description below.

Subsequently, Smit et al, in an article entitled "A Normalized Approach to the design of Low-Loss Optical Waveguide Bends", published in Journal of Lightwave Technology, Vol 11, No. 11, November 1993, described a normalised approach for optimal design of abrupt junctions between straight and curved waveguides in the Whispering Gallery Mode regime.

Next there is described in the article entitled "WKB Analysis of bend Losses in Optical Waveguides", and published in Journal of Lightwave Technology, Vol 18, No. 8, August 2000 a more complete Wentzel-Kramers-Brolluoin analysis of bend losses given for a circularly curved waveguide. The entire content of each of these documents is hereby incorporated by reference.

According to a first aspect of the present invention, there is provided an optical waveguide having a curved section in which, in the curved section, the waveguide has an asymmetric transverse refractive index profile, in which the refractive index varies asymmetrically across the width of the waveguide in dependence on the radius of the curved section of the waveguide. The asymmetric refractive index profile serves to counteract the mode-shifting effect of the bend, in theory causing the curve to behave like a straight section and therefore eliminating or significantly reducing the mismatch in boundary conditions and therefore supportable mode profiles between waveguide sections, which give rise to bend transition losses. A waveguide is thus provided in which bend transition losses can be eliminated or significantly reduced.

Simulations have shown that the loss in optical signal power propagating along waveguide bend transition points can be strongly reduced if such asymmetric perturbations are applied to the transverse refractive index profile of the waveguide in curved sections. FIG. 3C shows simulation results for propagating optical signal power within the waveguide 22, wherein the proposed refractive index perturbations have been applied to all curved sections. The results show that the transition bend losses inherent to FIG. 3B have been almost entirely eliminated giving rise to a dramatic improvement in signal energy transmission. In this case an improvement of over 1000% is predicted.

In an embodiment, the waveguide comprises a waveguide core and a waveguide cladding and in which variation in the refractive index is across the combined width of the core and the cladding of the waveguide. By providing the variation or perturbation across the entire waveguide cross-section i.e. the core and the cladding, an appropriate refractive index difference can be maintained between core and cladding.

In an embodiment, the refractive index of the core and cladding is increased (relative to the refractive index of the adjoining straight section) on the inner side of the waveguide curve and decreased on the outer side of the curve, whereby the point of inflection, at which the refractive index is the same as that of the adjoining straight waveguide, is on the core edge on the outer side of the curve. By providing the perturbation or variation in this way light propagating in a curved segment of a waveguide can be made to behave as if propagating through a straight waveguide irrespective of the bend radius i.e. the optical modes will not be shifted to the higher order modes on the outside of the bend as would typically happen in a conventional step-index waveguide.

In an embodiment, an asymmetric perturbation is applied to the refractive index across the entire cross-section of the waveguide so as to produce the desired transverse asymmetric refractive index profile.

In an embodiment, the waveguide is a planar waveguide provided on a support substrate, and the bends are in-plane bends. In other words, the bends occur in the plane of the support on which the waveguide is deposited, formed or positioned. Thus, where for example a flexible support is used, such as a flexible polyimide support layer, waveguides according to embodiments of the present may be used.

In an embodiment, the waveguide is a cylindrically curved waveguide and the required refractive index perturbation is defined by the following formula:

$$n_p(r) = n_o(r) \cdot \frac{R_T}{r} \quad (1)$$

in which r is the radial distance from the origin of the cylindrically curved waveguide at which the perturbed refractive index is calculated;

$R_T$ is the constant value for the outer bend radius of the waveguide in that given segment;

$n_p$ is the required perturbed refractive index profile as a function of r; and, $n_o$ is the original refractive index profile as a function of r.

The inventor recognises that this formula allows the perturbation in refractive index of a given waveguide segment to be calculated that would eliminate (or at least substantially reduce) bend transition losses incurred by any bends in the waveguide. This formula would be applied at a given distance z along the waveguide axis. By applying this formula at every point along the axis, one can calculate the required transversal and longitudinal refractive index profile for the whole waveguide. This is simplified significantly when the waveguide is composed of a limited number of segment types, whereby a segment is defined as a continuous section of waveguide for which the radius of curvature is constant. For instance, in FIG. 3A, waveguide 22 is composed of 3 segment types: i) straight segments, ii) cylindrical waveguides with a bend radius of 3 mm and iii) cylindrical waveguides with a bend radius of −3 mm (bending in the opposite direction to segment type ii). In such cases one needs only to calculate the transversal refractive index perturbation for each segment type.

It is clear that for a straight segment there is no change to the required index perturbation i.e.:

$$n_p(r) = n_o(r) \quad (2)$$

as both r and $R_T$ are infinite for a straight segment and as $R_T \to \infty$ and $r \to \infty$ then perturbation factor P:

$$P = \frac{R_T}{r} \to 1. \quad (3)$$

The effect of applying this radius dependent index perturbation to the whole waveguide is that the waveguide effectively behaves like one straight waveguide.

In more complex cases where the bend radius changes continuously along the waveguide axis, the transversal refractive index perturbation must also change in accordance with the instantaneous value of $R_T$, where $R_T$ is a function of z.

$$n_p(r, z) = n_o(r) \cdot \frac{R_T(z)}{r} \quad (4)$$

In an embodiment of such a complex case, the transition from a straight segment to a curved segment is not instantaneous, but gradual whereby the radius of curvature changes from infinite to the required bend radius over a finite (non-zero) length of waveguide.

In an embodiment, the waveguide is a polymer waveguide. Use of optical polymer is particularly preferred as it is easily processed, patterned and serves as the basis for a potentially lower cost embedded optical interconnect technology in future.

In an embodiment, the optical waveguide includes a mechanical stressing component provided on one or both sides of the waveguide to generate a mechanical stress-strain profile across the waveguide and thereby provide the required asymmetric variation in refractive index across the waveguide cross-section.

In an embodiment, mobile ionic impurities are provided in the waveguide in desired concentrations so as to provide the variation in refractive index across the waveguide cross-section when an appropriate electronic stimulus is applied to alter the distribution of impurities across the waveguide width and thereby the corresponding concentration-dependent refractive index.

In an embodiment, the optical waveguide comprises at least two continuous sections forming the waveguide, each of the at least two sections having a different radius of curvature.

In an embodiment, the waveguide has regions of different degrees of polymer chemical cross-linking, so as to provide the variation in refractive index across the waveguide width, whereby the varying degrees of cross-linking are produced by a corresponding varying curing stimulus. For example in the case of polymers which are cured with the application of actinic radiation (typically ultra-violet light), the intensity profile of the actinic radiation could be varied to generate the required refractive index profile.

Indeed, methods for varying the refractive index profile of a waveguide using a curing beam of varying intensity are known. In WO-A-03/065095, the entire content of which is hereby incorporated by reference, there is disclosed a method of fabrication of a chirped fibre Bragg grating of any desired bandwidth, using a beam of curing radiation. The intensity of the curing beam is modulated as a function of time at a frequency f(t).

Furthermore, in another example, in EP-A-1010025, the entire content of which is hereby incorporated by reference, there is disclosed, a method and apparatus for writing apodized Bragg gratings into an optical fiber. The method includes the steps of providing a waveguide having a photosensitive region and providing a writing beam of actinic radiation having a nominal diameter D, the writing beam defining an optical axis. A waveguide is translated relative to the optical axis of the writing beam at a known velocity which can vary with time. A modulator modulates the radiation intensity of the writing beam as a function of time t to deliver a fluence of radiation directly to the waveguide. The refractive index change at that position due to the radiation is related to the fluence delivered to that position.

In a further example, in WO-A-00/02075, the entire content of which is hereby incorporated by reference, there is disclosed a method and apparatus for writing arbitrary refractive index perturbations along an optical waveguide. Like the previous discussed examples, the disclosed method includes the steps of providing a waveguide having a photosensitive region and providing a writing beam of actinic radiation having a nominal diameter D, the writing beam defining an optical axis. A waveguide is translated relative to the optical axis of the writing beam at a known velocity i(v(t)). A modulator modulates the radiation intensity i(I(t)) of the writing beam as a function of time i(t) to deliver a fluence of radiation, directly to the waveguide.

According to a second aspect of the present invention, there is provided a method of making an optical waveguide comprising forming a waveguide on a substrate, the waveguide including at least one curved section and varying the refractive index profile of the waveguide across its width in dependence on the radius of the curve.

In an embodiment, the method comprises varying the refractive index in accordance with the following equation:

$$n_p(r) = n_o(r) \cdot \frac{R_T}{r} \quad (1)$$

in which r is the radial distance from the origin of the cylindrically curved waveguide at which the perturbed refractive index is calculated;

$R_T$ is the constant value for the outer bend radius of the waveguide within a given segment;

$n_p$ is the calculated perturbed refractive index at r; and, $n_o$ is the original refractive index at r.

In an embodiment, the waveguide is a cylindrically curved waveguide curved in two planes i.e. waveguide bends occur simultaneously both in-plane (in the x-z plane) and out-of-plane (in the y-z plane), and the required refractive index perturbation is defined by the following formula:

$$n_p(r_x, r_y) = n_o(r_x, r_y) \cdot P_x \cdot P_y \quad (5)$$

where $$P_x = \frac{R_{Tx}}{r_x} \quad (6)$$

$$P_y = \frac{R_{Ty}}{r_y} \quad (6.1)$$

in which
$r_x$ is the radial distance from the origin of the cylindrically curved waveguide projected in the x-z plane at which the perturbed refractive index is calculated;
$r_y$ is the radial distance from the origin of the cylindrically curved waveguide projected in the y-z plane at which the perturbed refractive index is calculated;
$R_{Tx}$ is the constant value for the outer bend radius of the waveguide segment projected in the in the x-z plane;
$R_{Ty}$ is the constant value for the outer bend radius of the waveguide segment projected in the in the y-z plane;
$P_x$ and $P_y$ are the required refractive index perturbations in the x-z and y-z planes respectively
$n_p(r_x, r_y)$ is the required refractive index profile as a function of $r_x$ and $r_y$; and,
$n_o(r_x, r_y)$ is the original refractive index profile as a function of $r_x$ and $r_y$.

In an embodiment, the refractive index of the waveguide is varied during manufacture of the waveguide. Accordingly, the refractive index profile can be defined during manufacture according to the required application.

In an embodiment, the refractive index of the waveguide is varied by varying the transverse intensity profile of curing radiation used to cure the optical materials forming the waveguide. Generally known laser curing techniques can be modified as described herein so as to provide the required transverse refractive index profiles.

In an embodiment, the waveguide is formed of an electro-optical polymer that changes refractive index in response to an applied electric field. The desired asymmetric variation in the transversal refractive index of the waveguide or an approximation thereof is induced by applying an electric field gradient to the waveguide.

In an embodiment, the refractive index is varied across the waveguide using in-plane mechanical strain elements, whereby the photo-elastic properties properties of the polymer cause a change in refractive index when mechanical stress or strain is applied due to the strain-optic effect. By applying an appropriate stress-strain profile across the waveguide width the desired asymmetric transversal refractive index profile or an approximation thereof can be induced.

Some optical materials such as MgO-doped LiNbO3 exhibit piezo-optical behaviour, whereby a change in refractive index is induced by the application of pressure. The transversal refractive index profiles of waveguides composed of piezo-optical materials can be similarly manipulated by mechanical strain elements.

In an embodiment, the refractive index is varied across the waveguide using thermal elements, whereby the thermo-optic properties of the polymer are used to induce a temperature dependent change in refractive index, and an appropriate temperature distribution profile is applied across the waveguide width to create or approximate the desired transversal refractive index profile.

In an embodiment, a magneto-optical polymer is used, which comprises an optical polymer incorporating a dispersion of fine magnetic particles. The refractive index of such a polymer composite can be changed in response to a magnetic field. Thus the desired transversal refractive index or an approximation thereof can be induced by applying a magnetic field gradient across the waveguide.

In an embodiment, the waveguide has a refractive index profile that is a step, such that a core region has a constant value of refractive index $n_{core}$ and the cladding region has a constant value of refractive index $n_{cladding}$ in which the x-axis lies in the plane of the bend and the centre of the waveguide core of width w is chosen as the x-axis origin, the refractive index profile n(x) of the step-index waveguide being defined as follows:

$$n(x) = \begin{cases} n_{core} & \text{for } x \leq \frac{w}{2} \text{ and } x \geq -\frac{w}{2} \\ n_{cladding} & \text{for } x < -\frac{w}{2} \text{ and } x > \frac{w}{2} \end{cases} \quad (7.1)$$

and wherein the variation in the refractive index profile is defined as follows:

$$n_p(x) = \begin{cases} \dfrac{R_T}{R_T - \frac{w}{2} + x} \cdot n_{core} & \text{for } x \leq \frac{w}{2} \text{ and } x \geq -\frac{w}{2} \\ \dfrac{R_T}{R_T - \frac{w}{2} + x} \cdot n_{cladding} & \text{for } x < -\frac{w}{2} \text{ and } x > \frac{w}{2} \end{cases} \quad (7.2)$$

where:
w is the waveguide core width,
x is the x-coordinate along the width of the waveguide at which the perturbed refractive index is calculated, the x-axis origin being at the core centre, and
$R_T$ is a constant value for the radius of curvature of the outer core edge of the waveguide bend.

In another embodiment, the waveguide has a core region defined by a refractive index, which varies parabolically around a maximum value of refractive index $n_{core}$ at the centre of the core and a cladding region with a constant value of refractive index $n_{cladding}$, in which the x-axis lies in the plane of the bend and the centre of the waveguide core of width w is chosen as the x-axis origin, the refractive index profile n(x) being defined as follows:

$$n(x) = \begin{cases} n_{core} \cdot \sqrt{1 - 2\Delta\left(\dfrac{2x}{w}\right)^2} & \text{for } x \leq \frac{w}{2} \text{ and } x \geq -\frac{w}{2} \\ n_{cladding} & \text{for } x < -\frac{w}{2} \text{ and } x > \frac{w}{2} \end{cases} \quad (7.3)$$

in which $\Delta$ is the index step defined as follows:

$$\Delta = \frac{n_{core}^2 - n_{cladding}^2}{2 \cdot n_{core}^2} \quad (7.4)$$

such that the variation in refractive index is defined as follows:

$$n_p(x) = \begin{cases} n_{core} \cdot \dfrac{R_T}{R_T - \dfrac{w}{2} + x} \cdot \sqrt{1 - 2\Delta\left(\dfrac{2x}{w}\right)^2} & \text{for } x \leq \dfrac{w}{2} \text{ and } x \geq -\dfrac{w}{2} \\ n_{cladding} \cdot \dfrac{R_T}{R_T - \dfrac{w}{2} + x} & \text{for } x < -\dfrac{w}{2} \text{ and } x > \dfrac{w}{2} \end{cases} \quad (7.5)$$

where:

w is the waveguide core width, x is the x-coordinate along the width of the waveguide at which the perturbed refractive index is calculated, with the x-axis origin at the core centre, and $R_T$ is the constant value for the radius of curvature of the outer core edge of the waveguide bend.

Thus, irrespective of the original unperturbed refractive index profile it is possible to determine the required variation or perturbation so as to achieve the effects described herein.

Embodiments of the present invention will now be described in detail with reference to the accompanying drawings, in which:

FIG. 3A is a schematic representation of a waveguide including plural bent and straight portions;

FIG. 3B is a schematic representation of the variation in optical power of a signal propagating along the waveguide of FIG. 3A having a transversal step-index profile, which does not change along its axis;

FIG. 3C is a schematic representation of the variation in optical power of a signal propagating along the waveguide of FIG. 3A, whereby the transversal refractive index profile is perturbed according to the present disclosure;

FIGS. 10A to 10C show schematic three dimensional representations of cross-sections through the waveguide of FIG. 9;

FIGS. 10D to 10F show schematic three dimensional representations of cross-sections through a waveguide having a circular cross-section, as might be the case in for example, optical fibres or polymer optical fibres;

Figure 5:
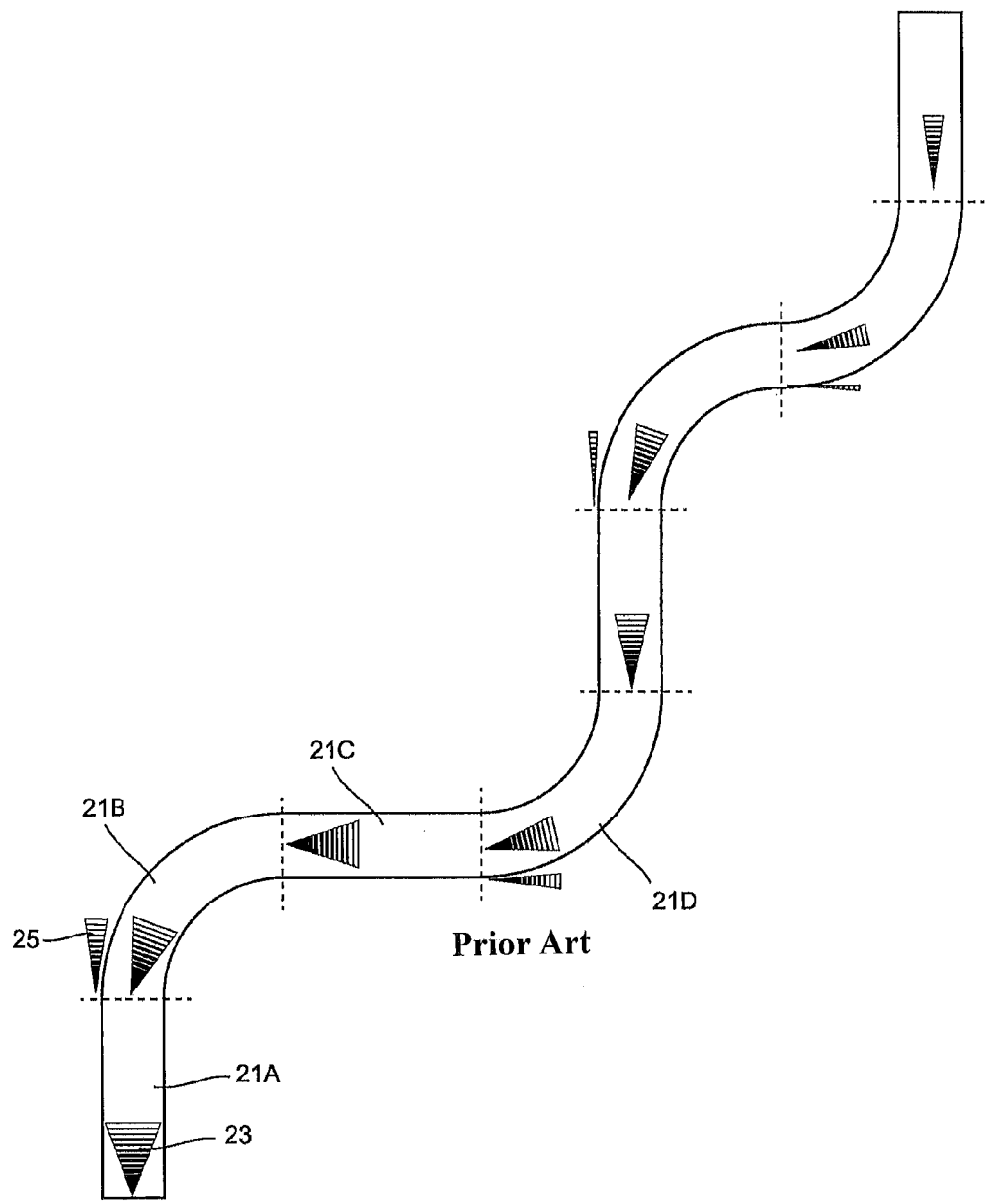
FIG. 5 shows a schematic representation of the curved waveguide of FIGS. 4A and 4B with an optical signal propagating along it.

Referring to FIG. 5, a schematic description of a waveguide is shown with multiple bend segments and transition points between segments. An optical signal cone 23 represents the angular extent of a propagating optical signal bound by total internal reflection within the waveguide core. It can be seen that upon transition of the optical signal from a straight section e.g. 21A to a curved section e.g. 21B a proportion of the optical signal energy is expelled from the waveguide. Transition losses are most apparent where there is a sudden reduction in radius of curvature. This also applies more strongly to "waveguide inflection points" where a curved waveguide segment immediately transitions to another waveguide segment curved in the opposite direction. Such an inflection point occurs between segment 21F and 21G. Transition losses at inflection points are typically greater than those between straight segments and curved segments. The reason for this is that there is a greater relative change in radius of curvature and therefore in the waveguide boundary conditions.

Figure 6:
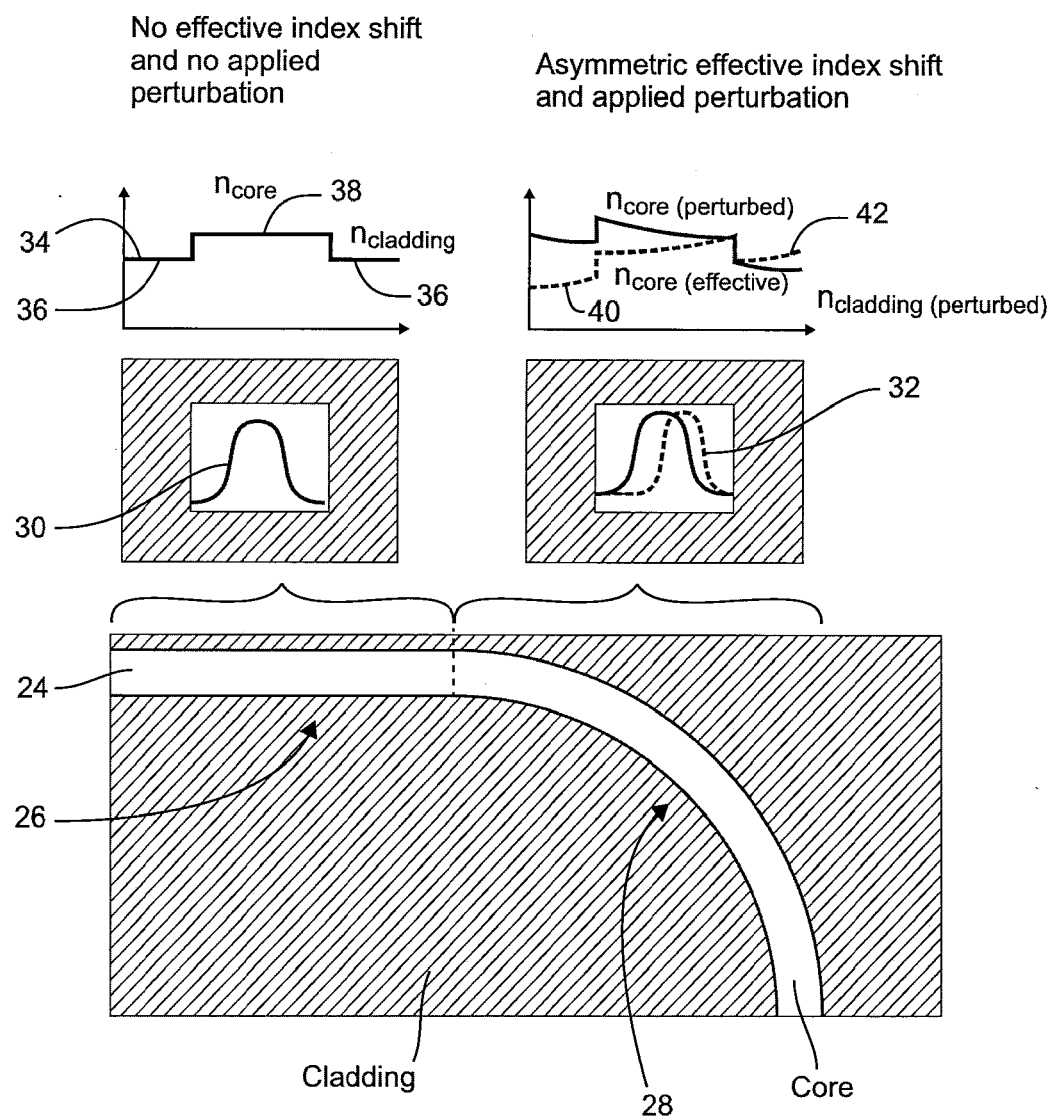
FIG. 6 is a schematic representation of a waveguide including a bent and straight portion modified according to the present disclosure.

Referring to FIG. 6, a waveguide 24 is provided having a straight section 26 and a curved section 28. The curved section may be considered a cylindrically curved waveguide. As explained above, due to differences between the boundary conditions in the straight section 26 and the curved section 28 certain optical modes supported in the former cannot be supported in the latter giving rise to "modal expulsion" as an optical signal propagates from the straight section to the curved section, whereby a portion of the optical signal energy is expelled from the waveguide during the transition. The energy of a central optical mode 30 (the fundamental mode in this case) is, after transition, coupled to higher order modes along the outer waveguide bend giving rise to the apparent squeezing of the mode 32 along the outer bend. Thus, a perturbation is applied to the transverse refractive index profile of the bent waveguide segment to compensate for the redistribution of modal energy during the transition. The perturbation is such that the waveguide has an asymmetric refractive index profile across the cross-section of the waveguide in dependence on the radius of the curved section. The perturbation and asymmetry is preferably radial with respect to the curve or bend of the waveguide. In other words, it is transverse to the longitudinal axis of the waveguide in the direction of the bend.

Typically, the width and height of the waveguide core would be between 30 and 100 microns. Preferably, the width and height is between 40 and 70 microns. The cross-section can be any desired shape, including any of square, rectangular, semi-circular or circular.

The waveguide is defined primarily by the core and a limited volume of the cladding around it to account for the refractive index change, bounding the optical modes and evanescent optical signal propagation (the "evanescent tail"), which occurs just outside the core. The disclosed index perturbations are, preferably, also applied to the cladding, however it should be noted that they should only be applied over a limited volume of surrounding cladding, which constitutes in combination with the core, the functional waveguide. Typically this cladding volume, which serves as part of the functional waveguide, will extend to no more than 5 microns-10 microns beyond each core edge (either vertically or horizontally). Therefore, the index perturbation applied to the cladding surrounding the core need not extend to beyond 5 microns-10 microns outside the core edges.

The refractive index perturbation is preferably applied to both the waveguide cladding and the waveguide core since the containment characteristics of the waveguide are affected by the refractive index difference between the cladding and the core (henceforth referred to as the delta) and it is preferable to maintain a consistent delta as large variations can impact on certain waveguide performance characteristics such as dispersion. Waveguide dispersion determines the degree of pulse spreading in the waveguide and how far and how fast a signal can be sent before signal integrity is irretrievably impaired due to intersymbol interference. Dispersion increases with the numerical aperture of the waveguide, which in turn increases with the delta between core and cladding.

This is particularly relevant when dealing with tighter bends requiring larger asymmetric index perturbations. If, for example, the required perturbations were applied to just the core and not the cladding, then the delta on the inner bend would be significantly larger than that on the outer bend, which would adversely affect signal integrity.

In general, and as can be seen in FIG. 6, the outer core edge 43 is an inflection point where the effective index is the same. The index increases moving radially toward the centre of the curve from this point and decreases moving radially away from the centre of the curve.

The refractive index profile for the waveguide 34 includes both cladding sections 36 and a core section 38. In this example, the waveguide has a typical step-index index profile, whereby the index of the core section 38 and cladding sections 36 have a flat profile. The disclosed perturbation is applied to the refractive index of both the cladding and the core in the curved section 28 of the waveguide, with respect to that of the straight section 26.

The effective refractive index shift, signifying the profile, which applied to a straight waveguide segment, would cause it to behave like the curved waveguide 28, is shown with a dashed line. The refractive index required to compensate for the effect of the bend is shown in a solid line superposed in the same graph. It can thus be shown intuitively how the purpose of the required perturbation is to cancel the effective refractive index shift thus causing the waveguide to behave like a straight segment with the same profile as that of the preceding straight waveguide segment. Therefore transition losses are eliminated or significantly reduced as the signal sees no change in boundary conditions (or effective refractive index profile) as it propagates from one segment to another.

This effect can be clearly seen in FIG. 3C, whereby the transition losses at each of the points T1 to T10 shown in 3B are almost completely eliminated by the application of the proposed index perturbations.

Figure 7:
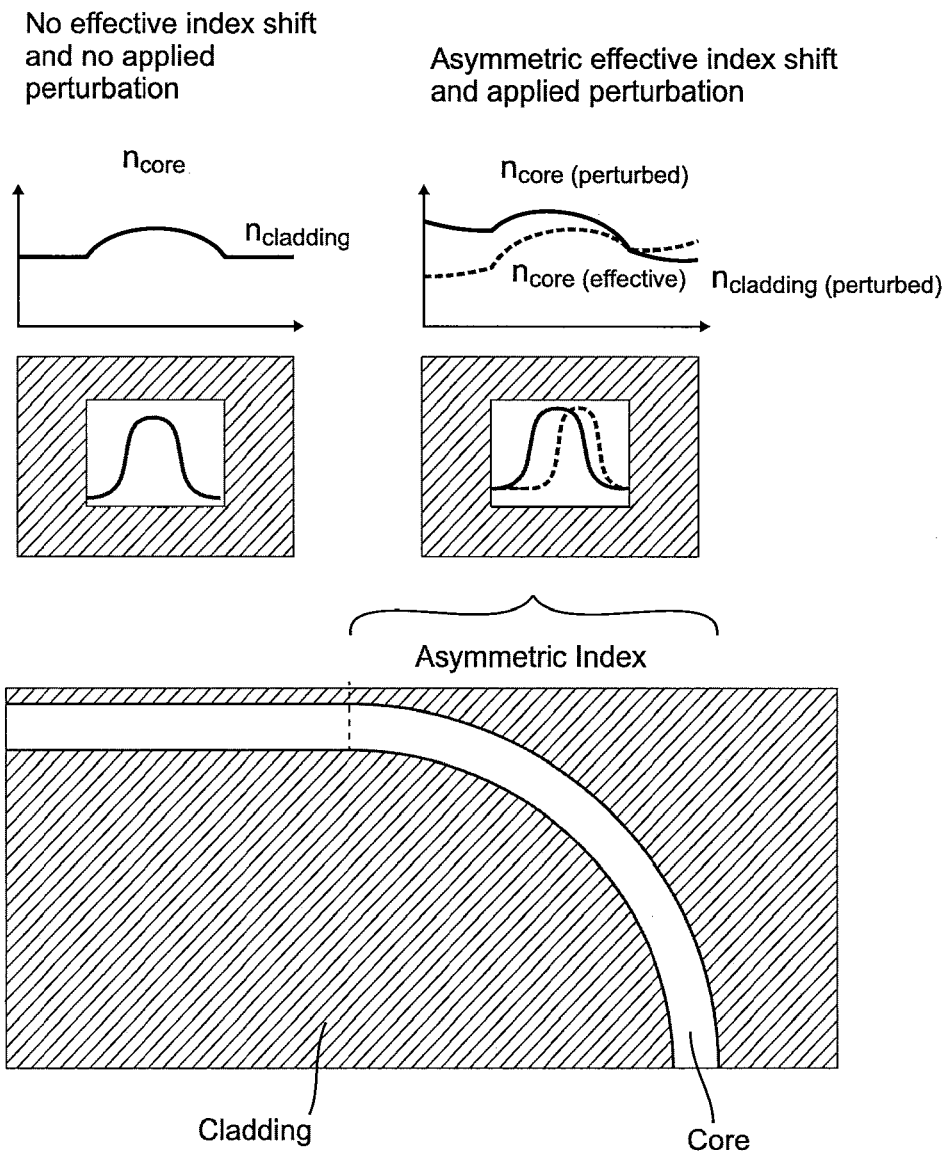
FIG. 7 is a schematic representation of a waveguide including a bent and straight portion modified according to the present disclosure.

FIG. 7 shows a similar embodiment to that of FIG. 6, except in this case the waveguide is not a step-index waveguide, but rather a graded-index waveguide, whereby the index of the core section varies parabolically around the centre of the core, while the cladding has a flat index profile. As with FIG. 6 the refractive index perturbation applied to the curved section counteracts the effect of the bend and thus eliminates bend transition loss as the optical signal propagates from the straight section to the curved section.

Figure 1:
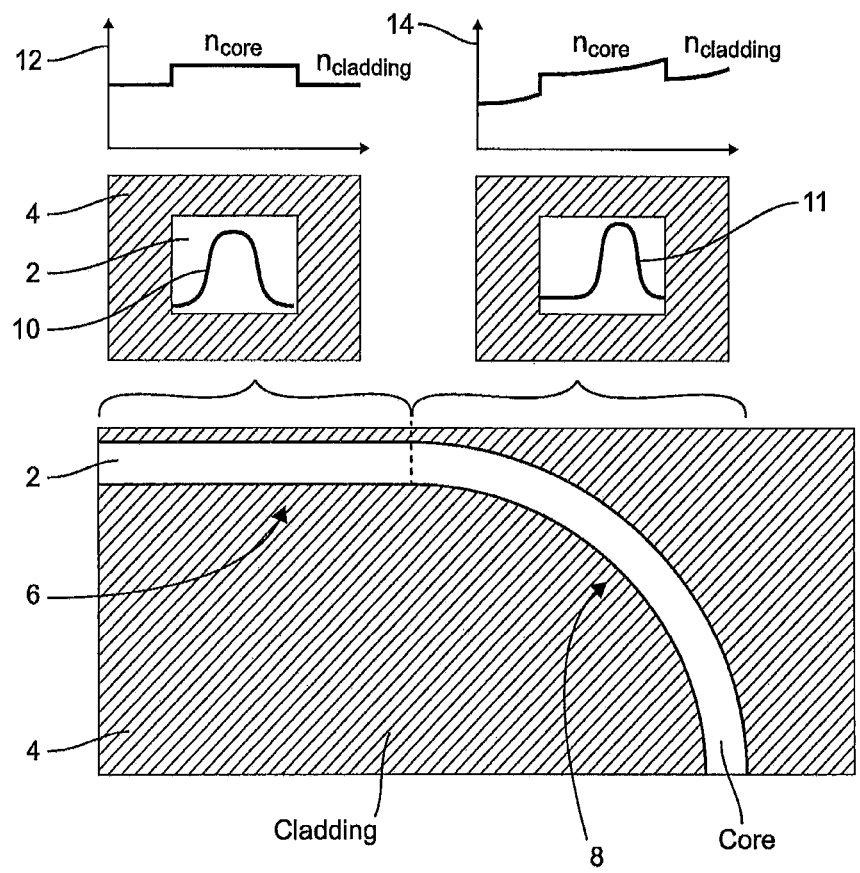
FIG. 1 is a schematic representation of a step-index optical waveguide including both the straight and bent waveguide segments.
Figure 2:
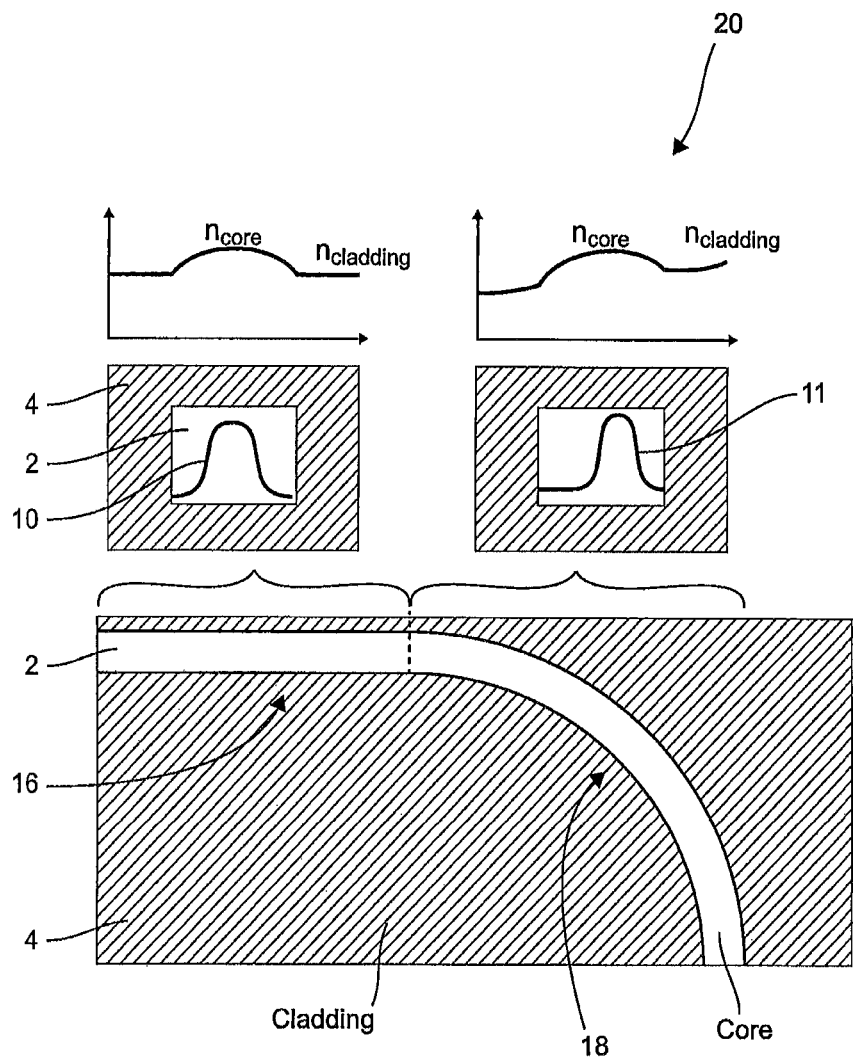
FIG. 2 is a schematic representation of an optical graded index waveguide including both the straight and bent waveguide segments.
Figure 4A:
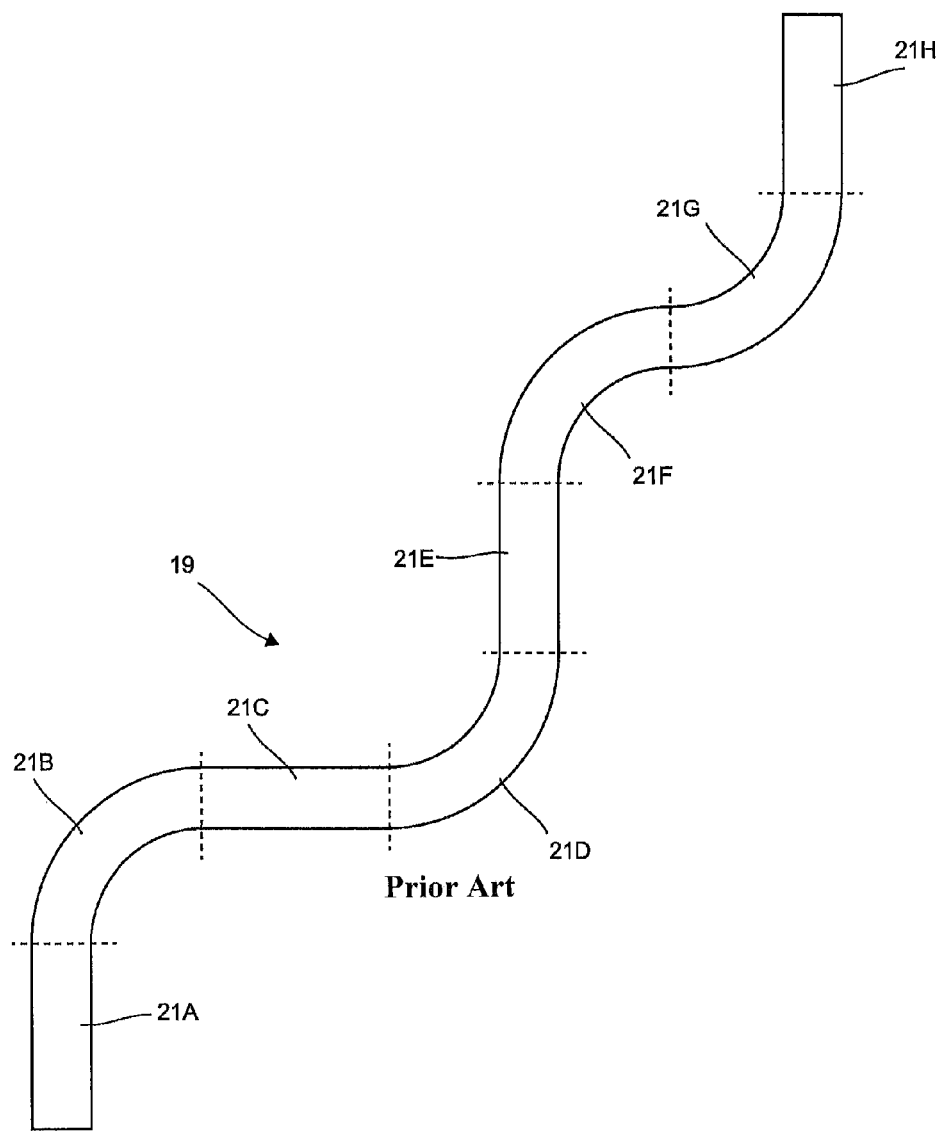
FIGS. 4A and 4B show schematic representations of a curved waveguide.
Figure 4B:
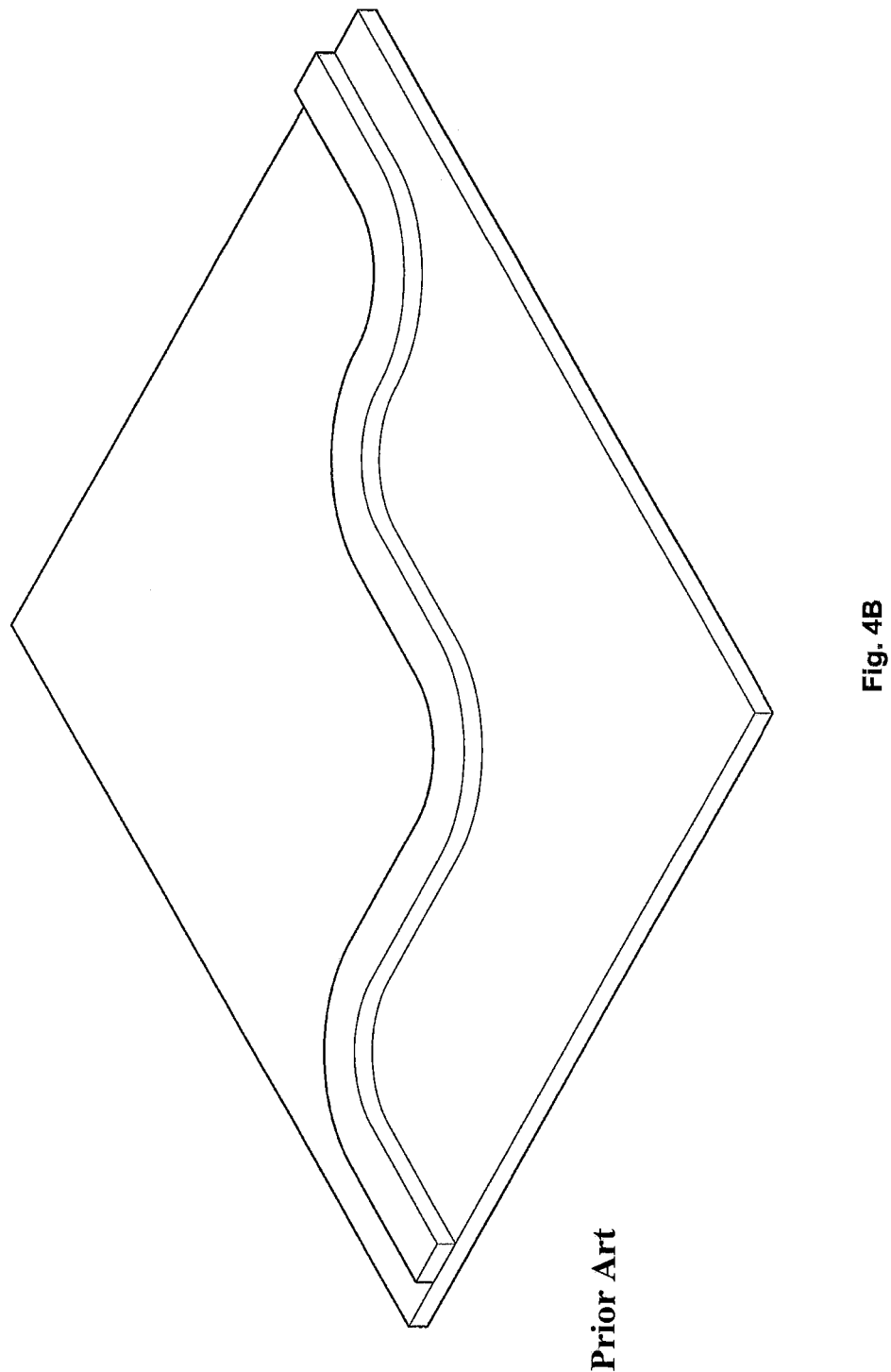
Figure 8A:
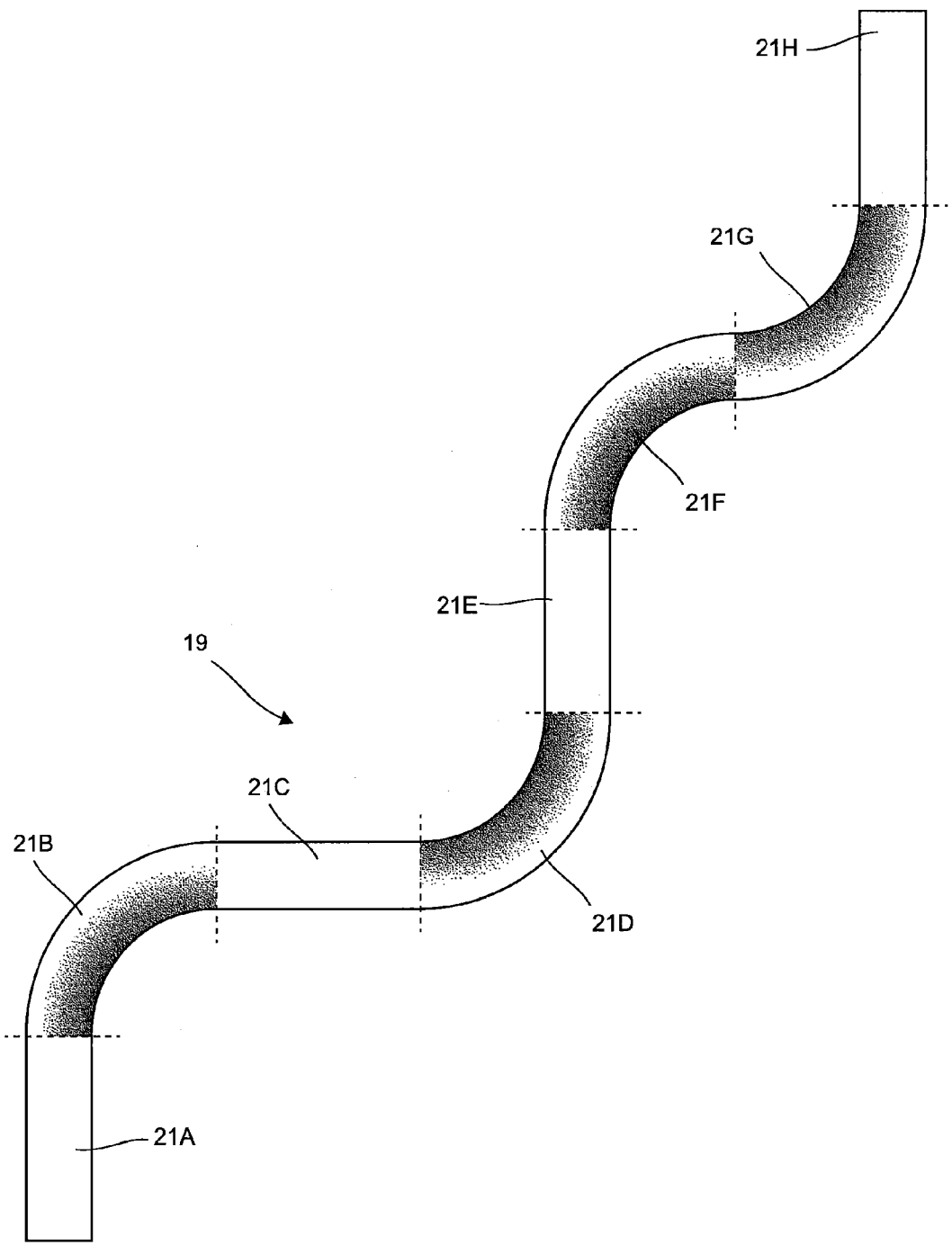
FIGS. 8A and 8B show schematic representations of a curved waveguide with a transverse perturbation in refractive index.
Figure 8B:
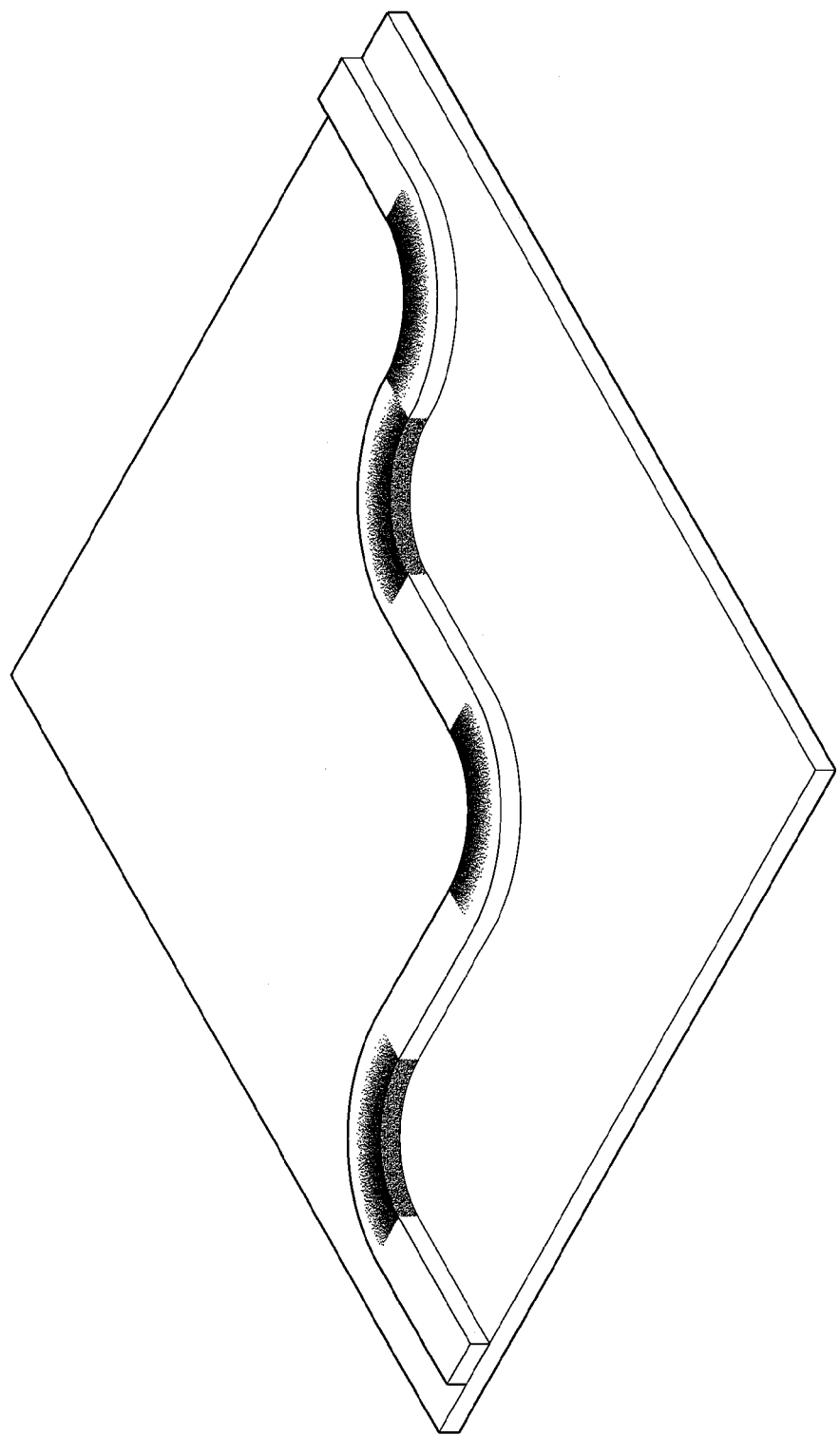
Figure 9:
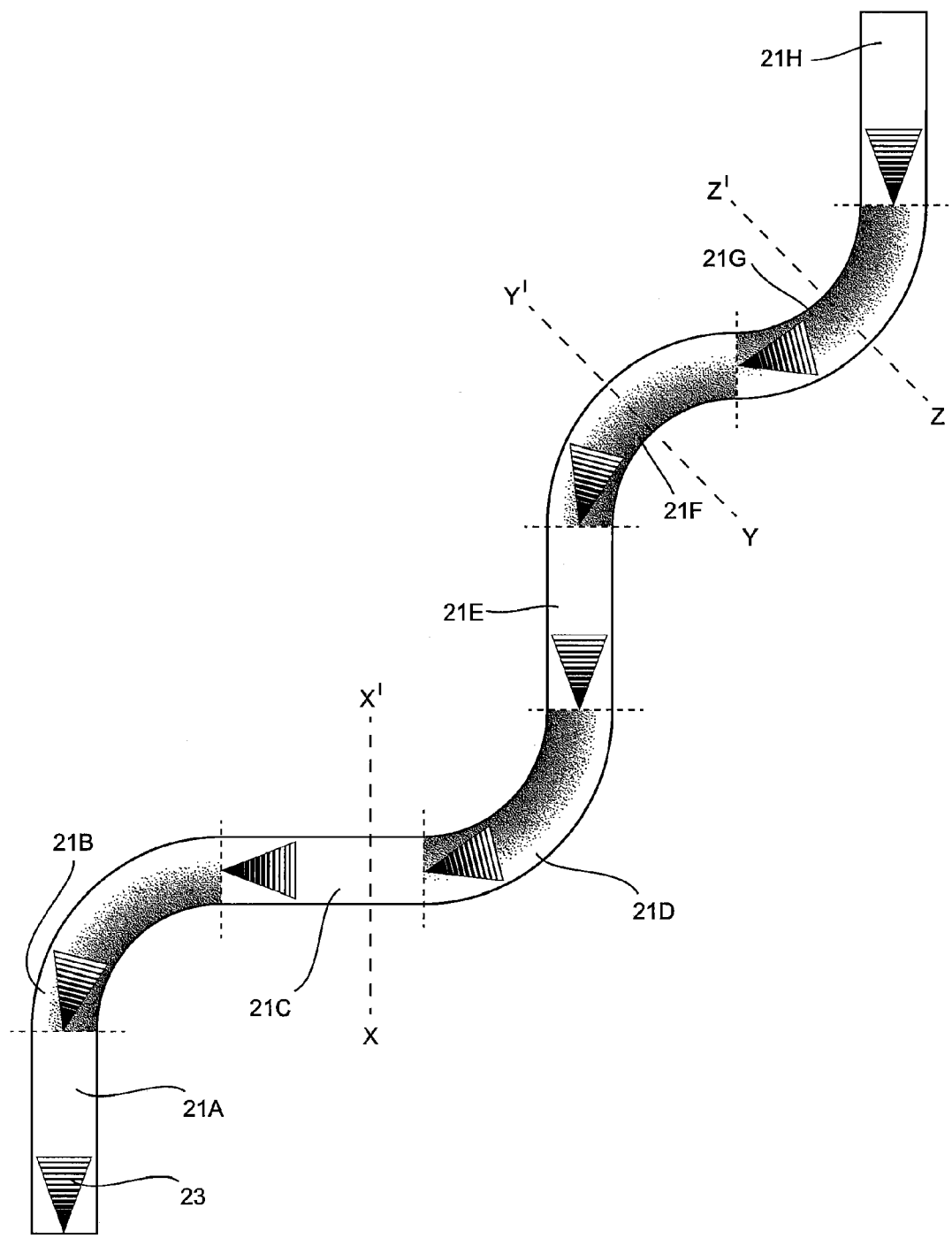
FIG. 9 shows a schematic representation of the curved waveguide of FIGS. 8A and 8B with an optical signal propagating along it.

Referring now to FIGS. 8A, 8B and 9, an example of the waveguide of FIGS. 4A and 4B is shown. However, in this case a transverse refractive index profile perturbation is applied as described above. On the inner side of the curved core sections, the refractive index is increased relative to the straight sections, as indicated by the shading. Accordingly, when the optical signal 23 passes from a straight section, e.g. 21A, to a curved section, e.g. 21B, there is substantially no expulsion of the optical signal energy. This enables a signal to propagate over a longer overall length of waveguide or a lower power of input signal to be used.

FIGS. 10A to 10C show schematic three dimensional representations of cross-sections through the waveguide of FIG. 9 along lines XX', YY' and ZZ', respectively. As can be seen in FIG. 10A the transverse refractive index profile is flat and represents that of a conventional step-index waveguide. In FIG. 10B, a perturbation is provided such that on the inside of the curve the refractive index is increased compared to that of the flat profile. In FIG. 10C, again on the inside of the curve the refractive index is raised compared to the flat profile.

As can be seen in the transverse refractive index profiles at the bottom of each figure, the perturbation occurs only in one dimension, namely the width x of the waveguide, with no change in refractive index occurring along the y axis. The reason for this is that the perturbation is only required within the plane in which the bends occur. As typically optical waveguides will be deposited on a flat substrate e.g. a PCB, and bends will occur within the plane of that substrate, the perturbation need only therefore be applied to one dimension. This significantly simplifies the manufacture of such perturbed waveguides.

In the rarer case in which waveguide bends occur out-of-plane, the refractive index profile will be the same however applied across the waveguide height (y-axis) as opposed to the waveguide width.

In the event that waveguide bends occur simultaneously both in-plane (in the x-z plane) and out-of-plane (in the y-z plane), then first the perturbation for one bend plane must be applied, then the perturbation for the second bend plane applied to the first perturbed profile as defined above.

FIGS. 10D to 10E show similar views to those of FIGS. 10A to 10C, except in this case the waveguides have circular cross-sections. Accordingly, as can be seen, the refractive index varies across the cross-section of the circular waveguide so as to provide the same effects discussed above, i.e. of reducing leakage of light when a signal passes from a first waveguide section having a first radius (e.g. a straight section) to a second waveguide section having a second, different, radius (e.g. a curved section).

Figures 11A, 11B, 11C:
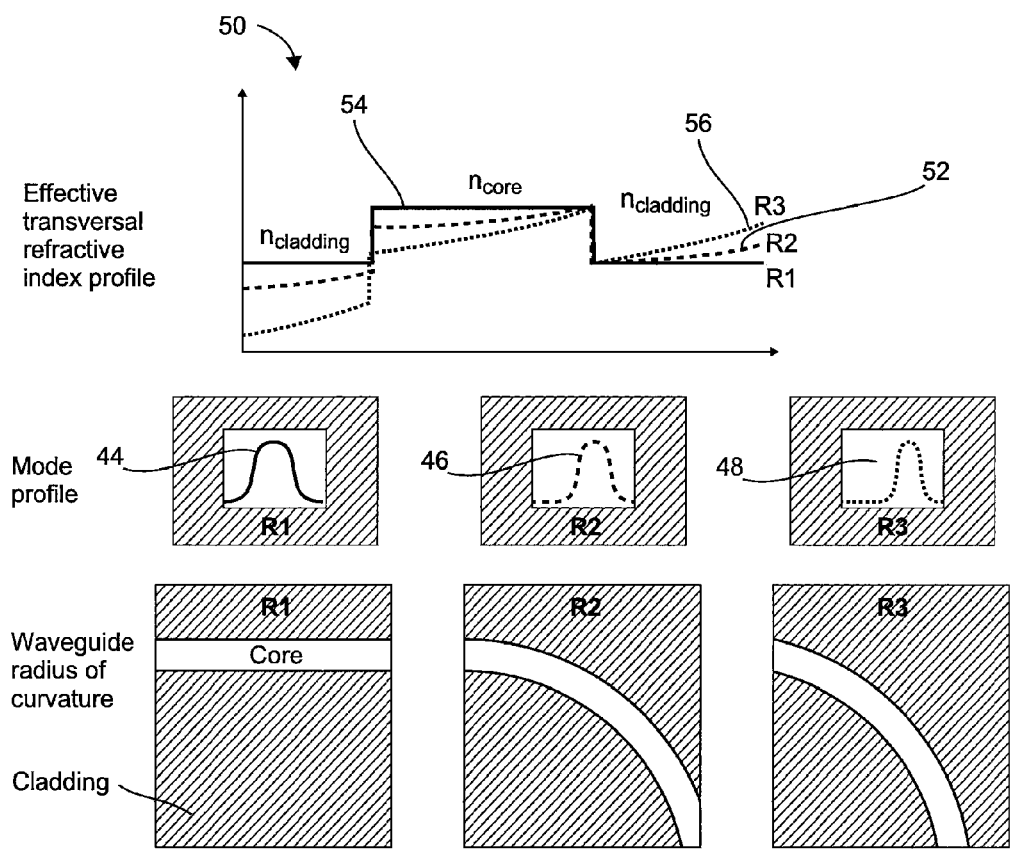
FIGS. 11A to 11C show examples of waveguides having different radii of curvature, with a representation of the corresponding effective variation in refractive index.

FIGS. 11A to 11C show three examples of waveguide sections in which the radius of curvature is different. In FIG. 11A, the radius R1 is effectively infinite given that the waveguide section is straight. The optical mode 44 is central to the waveguide core. In FIG. 11B, the waveguide has a radius R2. Accordingly, upon transition of the optical signal from segment R1 to R2, the optical energy of mode 44 is redistributed into a higher order modal distribution 46 on the outside of bend R2. As explained above such a transition would typically incur loss, as those modes supported in the straight segment R1, but not supported in the curved segment R2 would be expelled i.e. certain bound optical modes in segment R1 would be coupled to the radiation modes in segment R2. Similarly in FIG. 11C, the curved segment R3 has an even smaller radius of curvature than R2 and therefore would incur a larger transition loss if the original signal R1 were coupled directly to segment R3, than would be incurred during the transition of the signal from R1 and R2. A transition loss would also occur between R2 and R3 as here too the waveguide undergoes a reduction in its radius of curvature. Such a transition would again give rise to a redistribution of optical modal energy into a tighter higher order mode profile 48.

A graph 50 is shown which demonstrates the variation in effective refractive index profile caused by the curving of the waveguide in sections R2 and R3.

The effective refractive index profile 54 for the straight segment R1 is unchanged from the real refractive index profile of the waveguide (step-index) due to an infinite radius of curvature. The effective index profile 52 for the curved segment R2 shows an asymmetric distortion of refractive index around an inflection point on the outer core edge, whereby the effective index decreases moving towards the centre of the curve from the outer core edge and increases as we move away from the curve. The effective index profile 56 for the curved segment R3 shows the same asymmetric distortion of the step-index profile around the inflection point on the outer core edge, but to a greater degree as the curve is tighter.

In summary, as can be seen from the effective refractive index profiles 52 and 56 associated with R2 and R3 respectively, as the radius of curvature of a bend decreases, the degree of variation of the effective asymmetric profile from that of a normal (straight) segment increases.

Accordingly, using the present method a perturbation is applied to the refractive index profile of the waveguide in sections R2 and R3 so as to compensate for the effective distortion of the original index profile allowing optical signals propagating from one segment to the next to perceive little or no change in the effective transversal refractive index profiles and therefore to avoid the expulsion of optical energy at the segment interfaces.

It will be appreciated that typically in the layout of optical waveguides on an optical PCB, the entire length of a given segment will be formed with the same radius of curvature. Thus, the same perturbation can be applied along the whole length of the segment in question. However, in some cases the radius might vary along the length of the curved section, in which case the perturbation applied can similarly be varied along the length of the curved section.

Figure 12:
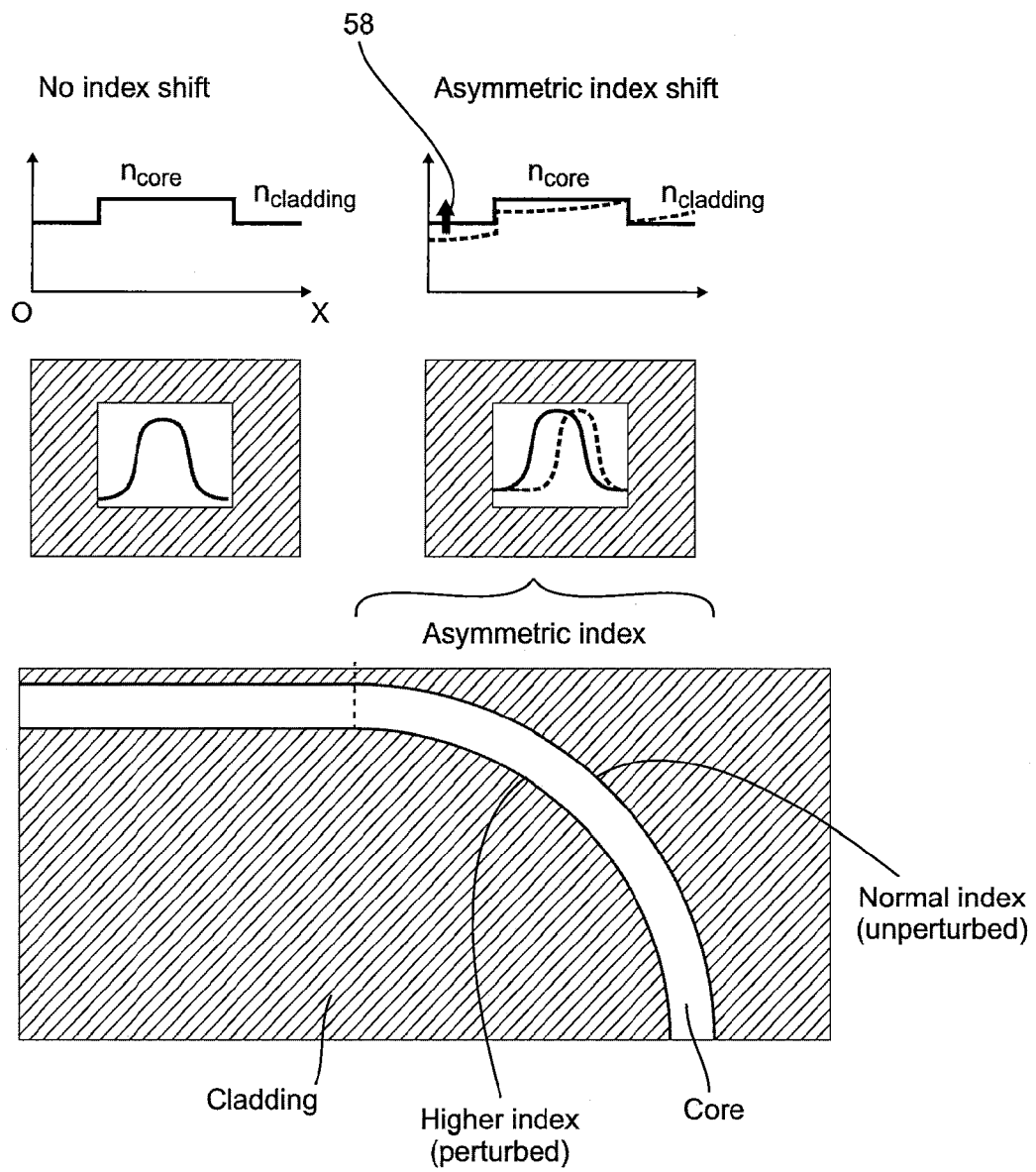
FIG. 12 is a schematic representation of an optical waveguide including a bent region and a straight region.

FIG. 12 shows a schematic representation of a waveguide including both a straight section and the curved section. As previously explained with respect to FIGS. 11A to 11C, a perturbation must be applied to the refractive index profile so as to ensure that the waveguide boundary conditions, which define the mode profiles that a given waveguide segment can support, do not change as an optical signal propagates from one segment having a first radius of curvature to a segment having a different radius.

In FIG. 12, a perturbation shift indicated by arrow 58 is applied to the refractive index of the waveguide so as to counteract the effective asymmetric bias in the refractive index caused by the waveguide curvature. As can be seen, the perturbation shift applied to the curved waveguide segment seeks to "pull" the effective refractive index profile back into the flat step-index profile of the straight waveguide segment preceding it.

In other words, what is provided, is an optical fibre or waveguide in which the actual transversal refractive index profile across the waveguide cross-section is varied so as to counteract the effective variation in transversal refractive index profile which occurs when a curved segment undergoes a conformal transformation to a straight section. Furthermore, all segments of differing radii of curvature can be "normalised" in this way i.e. have their effective refractive index profiles modified to match that of a straight section of the waveguide, so as to create a matching effective refractive index profile in all segments. Effectively the whole waveguide, regardless of layout should behave like one long straight waveguide of the same total length.

The term "waveguide segment" refers to a section of a waveguide that has a given radius of curvature. The waveguide itself will usually be a continuous structure. A straight segment effectively has an infinite radius of curvature, as explained above. The required perturbation P of refractive index for a curved segment is given by:

$$P = \frac{R_T}{r} \qquad (8)$$

And the perturbed refractive index $n_p$ at r is given by:

$$n_p(r) = P \cdot n_o = n_o(r) \cdot \frac{R_T}{r} \qquad (1)$$

(derived below), in which r is the radial distance from the origin of the curved waveguide at which the perturbed refractive index is calculated and $R_T$ is the constant value for the bend radius of the outer core edge of the waveguide (or waveguide segment).

By changing the refractive index profile of a waveguide as described, it is possible to counteract the changes in waveguide boundary conditions, which cause the expulsion of optical energy during propagation of an optical signal across the bend junctures between different waveguide segments. This expulsion of optical energy is commonly known as bend transition loss.

Linear Approximations of Asymmetric Refractive Index Perturbations

If it is not possible to change the refractive index exactly according to the perturbation formula disclosed herein due to manufacturing constraints, the required profile can be approximated by a linear or quasi-linear profile. This has the benefit of, in some cases, significantly simplifying manufacture or enabling the application of certain refractive index modifying stimuli, which lend themselves to a linearly or quasi-linearly changing influence, such as mechanical strain gradients, thermal gradients, electric field gradients and particle concentrations. Such stimuli can be thus applied to create a linear or quasi-linear asymmetric refractive index profile.

Thus, control of the refractive index profile of a waveguide as it varies between straight and curved sections enables bend losses to be counteracted and allows a waveguide of any design to behave effectively like a straight waveguide which experiences the least loss.

In the present system, an asymmetric refractive index perturbation is used to compensate for the effective refractive index shift which occurs across a waveguide when the waveguide experiences a change in its radius of curvature. As described above optical materials can be made to change their refractive index in response to a number of different influences, including curing methods during manufacture, and the application of electric field gradients, magnetic field gradients, mechanical stress or strain profiles, temperature gradients and particle concentration distributions. An asymmetric influence can therefore be applied across the curved segments of a waveguide, preferably a multi-mode waveguide, by various techniques to eliminate bend loss and thereby overcome the critical layout constraints, which inhibit deployment of embedded optical channels today.

As explained above, various methods and approaches can be utilised to generate the varied refractive index across the width of waveguide so as to achieve the described effect.

One method relies on laser patterning of optically curable materials such as photosensitive polymers. In this example, the intensity of the laser beam is modified by in-line optical filters to deliver a graded intensity beam onto the photosensitive material causing different amounts of cross-linking, i.e. curing, across the waveguide cross-section. As the refractive index of a polymer waveguide depends in part on the amount of cross-linking of the polymer material, such a waveguide could be simply manufactured with the required refractive index gradient.

Preferably, this would be deployed on pre-cured waveguides which have been thermally or optically cured to create the hardened geometric profiles of the waveguide. In other words the 3-dimensional shape of the waveguide is first fixed and then, in a subsequent step, varied degrees of cross-linking are introduced so as to produce the desired refractive index profile. Alternatively, the pre-curing process to create the waveguides and post-curing to create the refractive index profiles could be combined into a single manufacturing step, e.g. using multiple writing heads on the same stage, a first to cure the waveguide and a second to profile the index. Preferably the curing of the waveguides and creation of the desired transverse asymmetric refractive index profile is combined into the same curing step involving one curing head emitting an asymmetric intensity profile, wherein the energy of all parts of the curing beam are above a curing intensity threshold, sufficient to cure all parts of the waveguide, while providing an additional asymmetric intensity profile to further modify the refractive index across the waveguide width as required.

In one embodiment, laser writing is used and in the laser writing set-up, means to alter the intensity distribution of the writing or curing beam is provided such that the intensity distribution can be altered to match the required refractive index profile across the waveguide cross-section. This can be done in any convenient manner. Typically it is achieved by placing optical beam manipulators, which include but are not limited to neutral density filters, beam shaping elements or adaptive optical devices, in the beam path.

If the optical beam manipulators, are dynamic i.e. can be changed actively/remotely by the user so that the intensity distribution can be switched instantaneously during the waveguide writing process from one intensity distribution to another, then the laser writing beam can write out complete waveguides composed of differing waveguide segments, whereby the beam manipulators will be configured to provide a certain intensity distribution (and therefore write a certain cross-sectional refractive index profile), which depends on the radius of curvature on any given waveguide segment. In short, by using laser writing technology with dynamic (controllable) beam manipulators in the beam path, then the required cross-sectional refractive index profiles can be dynamically written during the fabrication of the entire waveguide.

Figure 13:
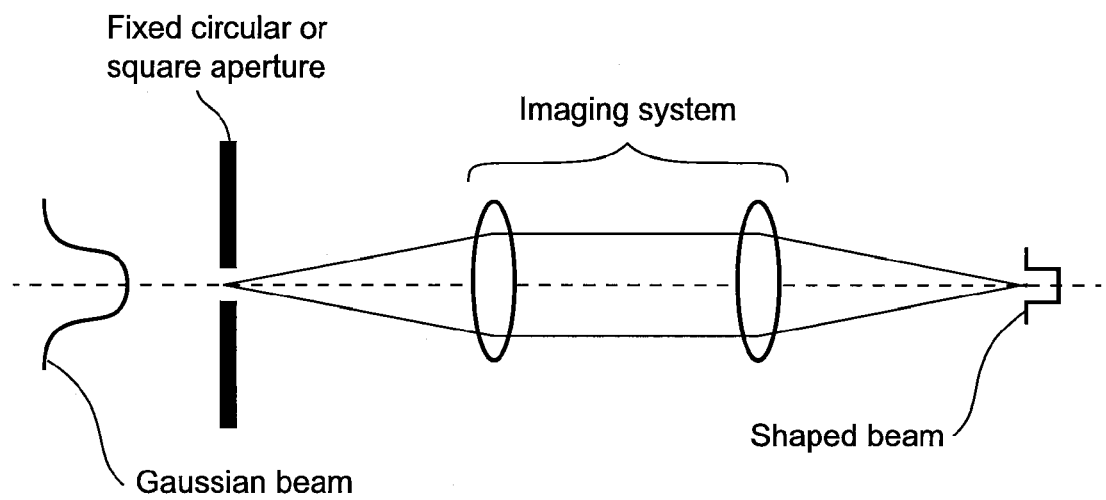
FIG. 13 is a schematic representation of an optical imaging system for use in forming waveguides of the present disclosure.

FIG. 13 shows a typical laser writing apparatus and set-up. A laser beam emitting at the frequency at which the optical polymer is to be cured is passed through a beam shaping arrangement. First the original beam is passed through a square or circular aperture, which has a diameter $\ll 1/e$ diameter of the original Gaussian beam. This way only the very top "flat" portion of the Gaussian intensity profile is passed through, giving rise to a writing beam with a substantially uniform optical intensity profile across the width. This is important as curing is a function of intensity and a Gaussian curing beam would give rise to a bell shaped waveguide. The reason a circular aperture may be preferable to a square aperture is that when the beam is used to write bends, a circular aperture, being radially symmetric, would not require that the beam is rotated (i.e. the translation stage holding either the laser of the substrate) to track the waveguide curvature. This would typically be required for a square aperture.

Figure 14:
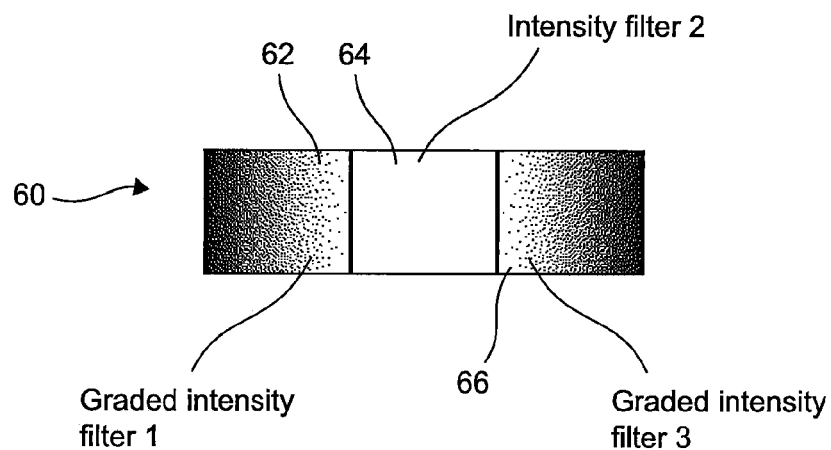
FIG. 14 is a schematic representation of an optical filter having variable transmissivity profiles.
Figure 15:
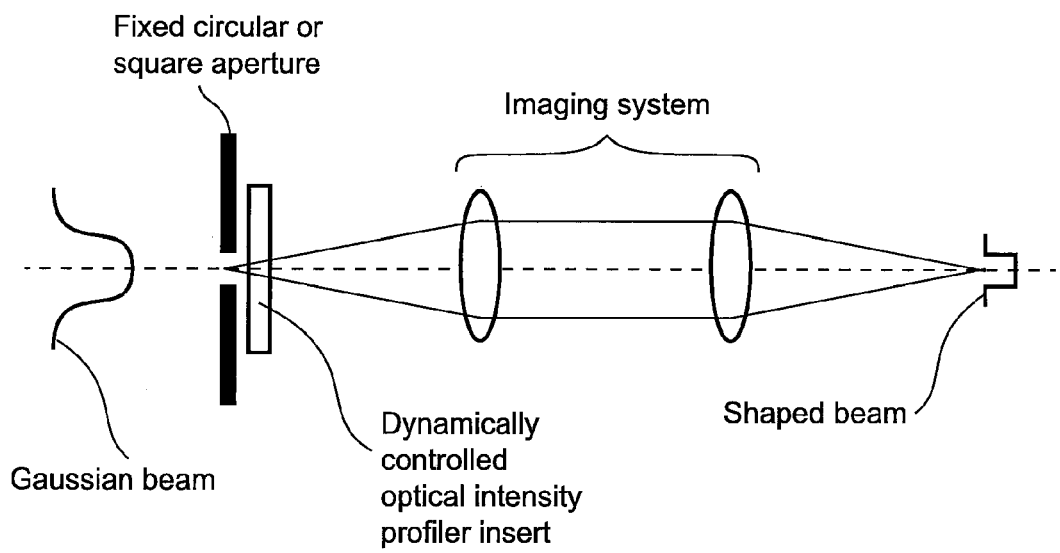
FIG. 15 is a schematic representation of an optical imaging system for use in generating an optical waveguide

Some means for varying the intensity profile is provided, as shown in FIG. 14. In FIG. 14 an insert 60 is shown composed of three intensity filter panels 62, 64 and 66. Filter panel 62 comprises a graded intensity filter, where the transmissivity is asymmetrically reduced from right to left giving rise to a matching intensity gradation of light passing through it. Filter panel 64 has an unchanging "flat" transmissivity profile. Filter panel 66 is the inverse of filter panel 62, whereby the transmissivity is asymmetrically reduced from left to right, giving rise to a corresponding asymmetrically varying intensity gradient.

The insert 60 is preferably positioned at an appropriate location within the imaging set-up of the beam writing apparatus of FIG. 13. For example it may be positioned in front of or behind the imaging aperture. The panels are typically sized so as to correspond to the aperture size. The insert is arranged to be rapidly movable such that during the beam writing process the required intensity distribution can be chosen on the fly. In this example, a waveguide can be fabricated which is composed of three different segment types: i) straight segment, ii) curved segment iii) curved segment in opposite direction to ii). This is the practical minimum number of segment types required to create a waveguide which can be routed from one arbitrary point on a substrate, typically a printed circuit board, to another.

From a design point of view, there are three primary reasons why in-plane bends are required on a waveguide: i) to change the direction of the waveguide axis for routing purposes ii) to circumnavigate obstacles on the substrate e.g. through-hole components and electrical vias on an electro-optical PCB and iii) to ensure that prior to crossing another waveguide on the same layer, its direction can be altered if necessary to optimise the angle at which it crosses the other waveguide, such as to minimise crosstalk. Optimally the crossing angle is 90°, however a range of acceptable angles exists at which waveguides can cross, while keeping crosstalk between the crossed waveguides below a certain threshold, this range of angles being determined by many factors including, but not limited to, the waveguide surface and side wall quality, fabrication process, numerical aperture and material dispersion.

In an alternative example, core cladding diffusion techniques could be used to develop the required transversal refractive index gradient.

In one example, GuideLink™ is a polymer waveguide technology originally developed by DuPont and currently offered by Optical InterLinks, Inc. This technology comprises a proprietary mix of monomer in a polymer matrix. Essentially when part of the polymer mix is exposed to curing radiation rapid diffusion of the mobile monomer into the exposed area occurs defining a region of higher refractive index that becomes the waveguide core. By applying a curing beam with an asymmetric intensity profile as opposed to a flat profile, the level of monomer diffusion can be varied across the waveguide cross-section such as to produce or approximate the desired asymmetric refractive index profile.

Schroder et al, in a paper entitled "Glass panel processing for electrical and optical packaging", published in the conference proceedings for Electronic Components and Technology Conference (ECTC), 2011 IEEE 61$^{st}$ (pp 625-633), describe a technique for patterning waveguides in thin glass sheets by immersion of glass foils into hot salt baths, and enabling selective exposure of those areas in which the waveguides are to be defined through a mask, to chemical diffusion of silver ions, thus increasing the refractive index of the glass foils where the diffusion occurs. By manipulating the degree of chemical ion exchange across the waveguide cross-sections the refractive index profile can be changed to the desired asymmetric transversal profile during manufacture. This can be achieved by for example using a variably permeable membrane across the exposed areas, whereby the level of membrane permeability controls the degree of ion-diffusion into the glass immediately below it and therefore the corresponding variation in refractive index. By choosing a membrane permeability which varies asymmetrically across the waveguide cross-sections, one can create or approximate the required transversal refractive index profile.

It will be appreciated that the effective refractive index profile created by conformal transformation of a bend segment to a straight segment is approximately linear for radii of curvature above 3 mm. It has been recognised that its profile becomes increasingly non-linear the smaller the radius. Intensity filters can therefore be created which match exactly the intensity profile required to create the exact counteracting refractive index profile to perfectly negate the effective refractive index profile on the bend.

Accordingly, there is provided a method that can be used to create a waveguide of arbitrary layout, which incurs little or no more loss than a perfectly straight waveguide of the same total length. This therefore eliminates the largest loss mechanism in a practical waveguide, namely the loss due to boundary condition mismatches between in-plane bend segments, described above, and allows waveguides to be potentially over 80% longer and accommodate significantly tighter bend radii. As mentioned above, using conventional optical waveguides on an optical PCB, typically the minimum bend radius achievable is about 10 to 15 mm. Using the present method, minimum bend radii as low as about 2 mm are achievable without incurring unacceptable losses. This is a practical value based on currently available material properties. In general the minimum bend loss is determined by the maximum variation in refractive index possible given the material and method of index perturbation, so in theory smaller bend radii can be achieved.

In the examples thus far described, the required index perturbation is achieved by modifying the material of the waveguide to increase cross-linking or other refractive index defining properties during manufacture of said waveguides.

Alternative means exist whereby the required index perturbation can be applied onto conventionally manufactured waveguides with unperturbed indices.

One preferred general type of means for achieving this effect is the use of elements deployed in-plane to generate a desired influence on the waveguide cross-sections thereby creating the required perturbation in refractive index profile.

One example is with the use of mechanical strain elements creating a strain gradient across the cores to generate the required index gradient. This is based on the photo-elastic effect common to most optical materials including glass and polymers.

It has been shown that when a patterned metal strip is deposited onto an optical polymer layer at high temperatures and then allowed to cool, that a stress and strain profile will be induced by the metal in the polymer due to different coefficients of thermal expansion in the different materials. In the reference papers below examples are described of how high temperature deposition of metal onto polymer, which is then allowed to cool, will give rise to stress and strain profiles in the polymer due to different coefficients of thermal expansion and corresponding refractive index variations.

Seong-Ku et al, in a paper entitled "Electro-optic phase modulator using metal-defined polymer optical waveguide" published in the journal Applied Physics Letters Vol. 87, Iss. 1 pp. 011107-011107-3 describe how a metal strip patterned on top of a three-layer slab waveguide causes an induced strain field that locally modifies the refractive index of the polymer, resulting in lateral optical mode confinement within the core layer i.e. the creation of a waveguide.

Seong-Ku et al, in a paper entitled "Polymer Optical Waveguide Switch Using Thermo-Optic Total-Internal-Reflection and Strain-Effect" published in Photonics technology Letters Vol. 22 Issue 4, in February 2010 (pp. 197-199) describes the demonstration of an optical waveguide switch using thermo-optic total-internal-reflection and strain-induced effects in polymer materials. The deposition of metal strips introduces strain in the underlying polymer materials, creating two strain-induced optical waveguides.

Figure 16:
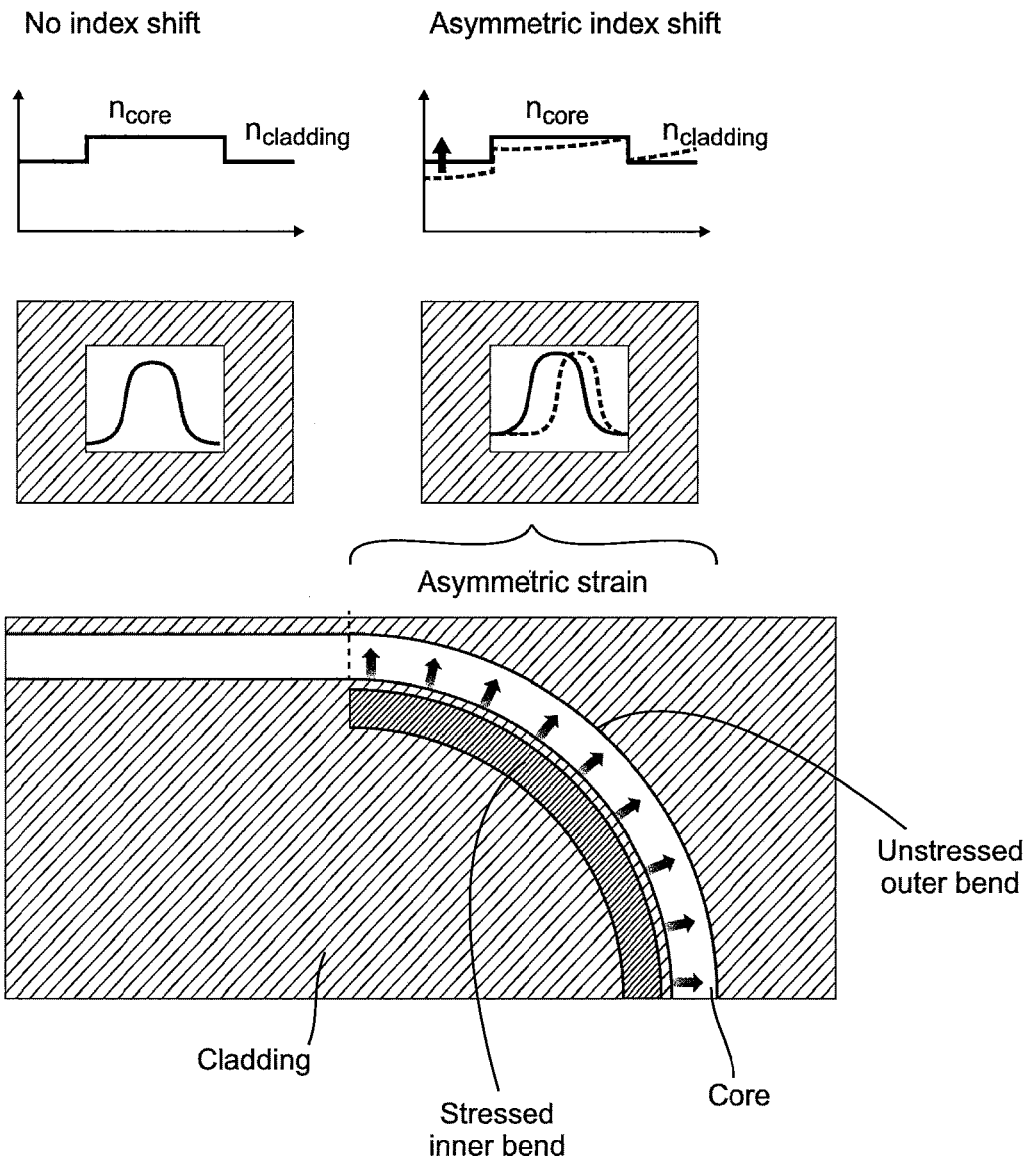
FIG. 16 is a schematic representation of an optical waveguide including a refractive index perturbing component.
Figure 17:
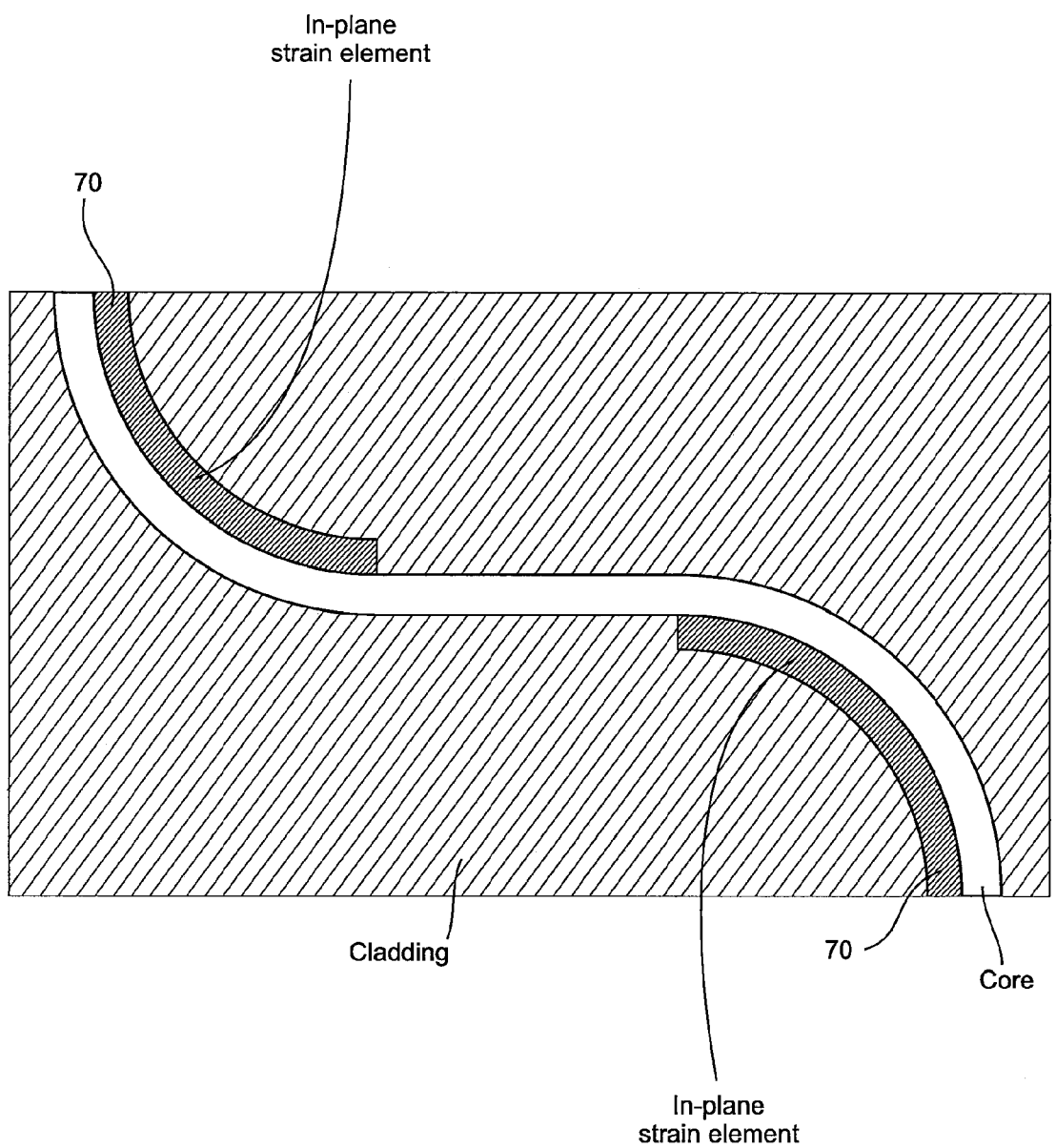
FIG. 17 is a schematic representation of an optical waveguide including mechanical stress elements.

FIGS. 16 and 17 show an example of this. In FIG. 16 strain is shown schematically acting on the inner boundary of the curved segment. In FIG. 17 an in-plane strain element 70 is fixed onto the PCB, in this example on a cladding layer, on which the waveguide is formed so as to put the waveguide under strain at the required positions. The strain element may be a metal strip or a strip formed of some other appropriate material.

The metal strips 70 are deposited around the polymer waveguide such as to induce an asymmetric stress gradient across the waveguide thus creating a corresponding asymmetric refractive index gradient to offset the effective refractive index gradient on curved waveguide segments. The stress gradient is tuned to the required profile by appropriate choice of materials, fabrication, cooling times, and geometry of traces, distance from waveguide and other parameters.

In another example, electro-active polymers are used to actively generate a strain gradient across the waveguide simply by applying a small voltage, e.g. from x V to y V. Certain electro-active polymers undergo a mechanical strain under the influence of an electric field. One special case is ionic electro-active polymers, which are formulated to include mobile ionic groups, which migrate under the influence of an electric field and generate an asymmetric strain along the cross-section due to mutual electro-static repulsion. Some variants of electro-active polymers are described below.

In this example, ionic optical polymers are formulated by tuning the formulation of current optical polymers such as polyacrylates and polysiloxanes to include ionic groups. As an example the ionic properties of ionic polymer "Nafion" are a result of incorporating perfluorovinyl ether groups terminated with sulfonate groups onto a tetrafluoroethylene (Teflon) backbone. Indeed Nafion is a sulfonated tetrafluoroethylene based fluoropolymer-copolymer. Some variants of Teflon are optically transparent such as Teflon® FEP and these variants are therefore also suitable materials for use in this example.

Figure 18:
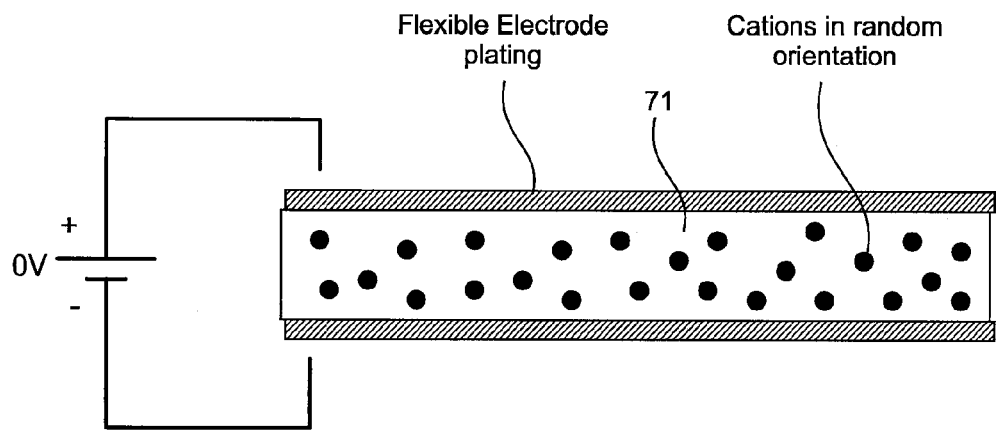
FIGS. 18 and 19 are representations of optical waveguides, which incorporate mobile ionic impurities, the concentration and transverse distribution of which can be controlled by electric stimulus.
Figure 19:
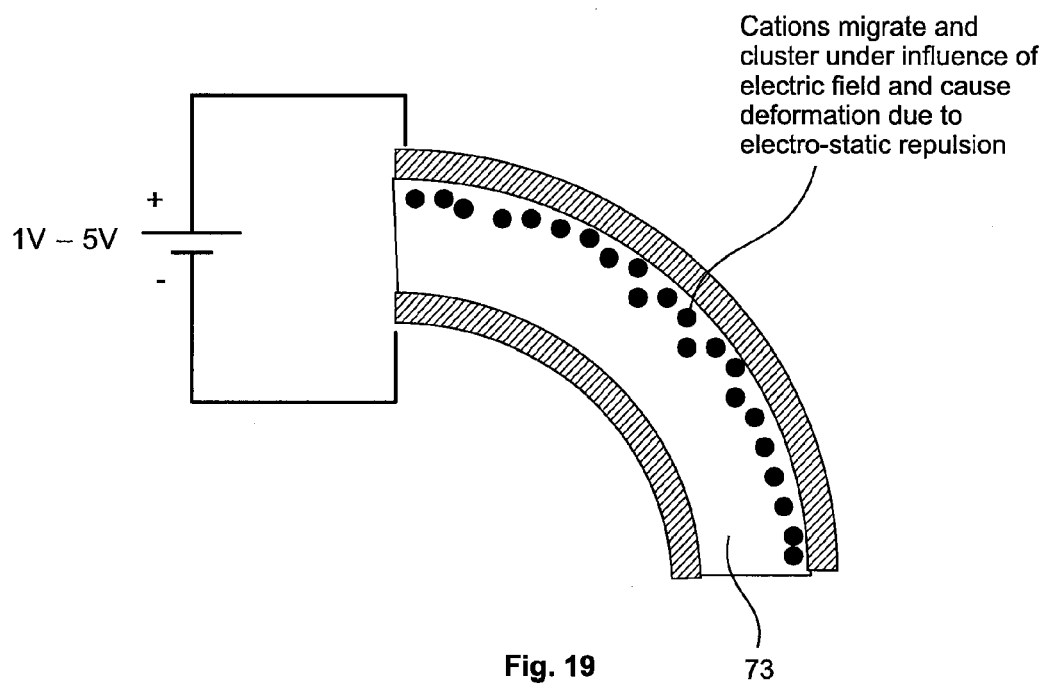

FIGS. 18 and 19 show examples in which waveguides 71 and 73 formed from electro-active polymers are provided with metallic electrodes on their sides. These figures show the effect of electrical bias across the waveguide cross-section; Particle concentrations in this context can influence refractive index in two ways. The use of light absorbing particles will cause an increase in optical absorbtion in proportion to the particle concentration, which in turn will change the refractive index according to the well known Kramers-Kronig relation. Alternatively or additionally, the sudden change in particle density in one part of the waveguide due to say an applied electric field and the subsequent mutual electro-static repulsion will cause an increase in mechanical stress in that part of the waveguide. A change in refractive index will then be induced through the strain-optic effect, whereby an increase in density typically gives rise to an increase in refractive index.

In common applications of electro-active polymers, such as for artificial muscles, the polymer devices change their shape and size in response to an electric field. An electro-active polymer strip therefore, which is free to move, will bend when an electric field is applied across it due to the electrostatic repulsion between cations concentrated on one side of the polymer material. This is analogous to the effect of a bimetallic strip under application of heat. In the example of FIG. 18, no voltage is applied to the electrodes such that the cations within the polymer strip 71 remain randomly distributed. In FIG. 19, a voltage of between 1 and 5V is applied across the electrodes and this causes an increase in concentration of ions on one side of the polymer strip.

An asymmetric mechanical strain is thereby created as the ions clustered on one side of the polymer strip repel each other and stretch that side of the strip out compared to the other side, thus causing the strip to bend. Being free to move in the shown example, the polymer strip 73, under the influence of the asymmetric concentration of the cations and corresponding electrostatic repulsion between them, will curve.

In a normal waveguide, which is not free to move like the polymer strip shown in FIGS. 18 and 19, but fixed in a substrate, the asymmetric ion distribution will manifest itself as a mechanical strain induced on one side of the waveguide giving rise to a corresponding asymmetrical refractive index profile. By variation of the applied voltage, the relative concentration and distribution of the ions can be controlled such that the desired refractive index perturbation can be generated.

Figure 20:
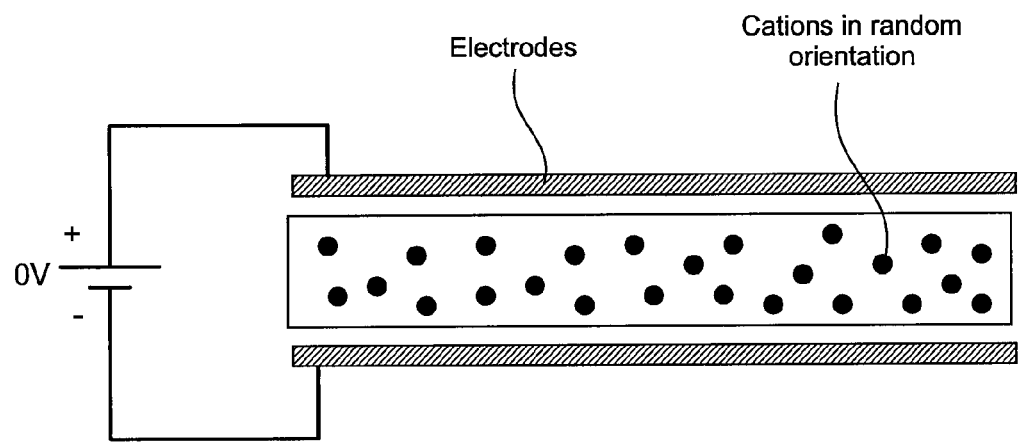
FIG. 20 is a representation of the optical waveguides of FIGS. 18 and 19, but with no electrical bias applied across the waveguide cross-section.
Figure 21:
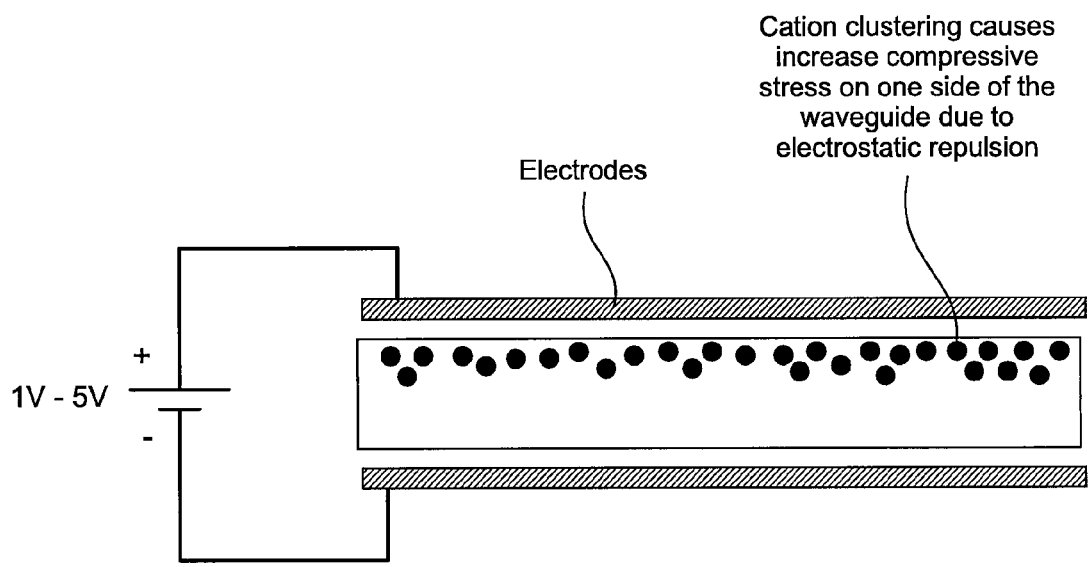
FIG. 21 is a representation of the optical waveguides of FIGS. 18 and 19, but with an electrical bias applied across the waveguide cross-section.

Thus in the example of FIGS. 20 and 21, the polymer waveguides are formulated to have ionic properties. In-plane electrode elements are arranged to provide a potential difference of typically a few volts, e.g. 1 to 5V, to create an electric field across the polymer structure. In FIG. 20, no voltage is applied and the ions are generally uniformly distributed throughout the polymer structure. In FIG. 21, the ions migrate under the influence of the electric field and cluster on one side of the waveguide. An asymmetric mechanical strain is thereby created.

Another example is with the use of temperature elements to provide heating or cooling and to thereby create a temperature gradient across the waveguides. The temperature gradient in turn generates the required refractive index gradient. This is most useful for polymers which typically have a high thermo-optic coefficient, i.e. a coefficient which determines the degree of change of refractive index in response to a change in temperature. The precise method used in any particular case depends on the specific application.

The waveguides are formed out of optical material with a suitably high thermo-optic coefficient, typically a polymer. Then heating structures are appropriately placed around the waveguide so that an almost linear temperature gradient may be formed across the waveguide cross-section. The refractive index of the high thermo-optic coefficient material varies with temperature and so by controlling the temperature profile across the waveguide, the refractive index profile can correspondingly be controlled.

Figure 22:
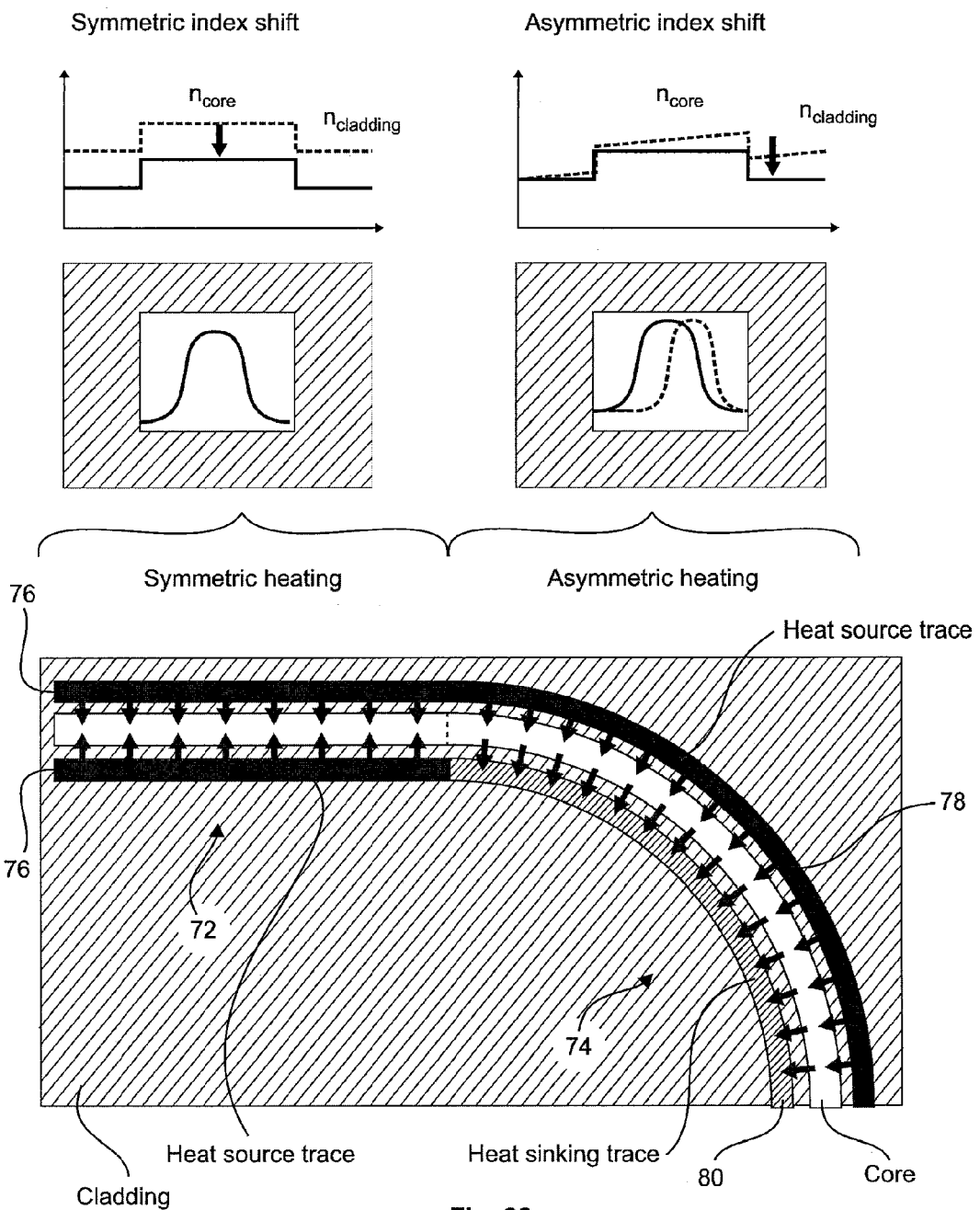
FIG. 22 is a schematic representation of an optical waveguide including heating elements to produce a thermal gradient across the waveguide cross-section and therefore a corresponding refractive index gradient to induce the required index profile or an approximation thereof.

FIG. 22 shows an example of such an arrangement. The waveguide has a straight section 72 and a curved section 74. Heat sources 76 are arranged symmetrically around the straight section 72. Around the curved section is provided one heat source on the outer side, and one heat sink on the inner side. Thus, heat generating and heat sinking elements are arranged in parallel along waveguide segments to achieve uniform heating of the straight waveguide segments and asymmetric heating of the curved waveguide segments The heat sources and heat sinks may be provided by resistive metal traces, e.g. copper traces, formed on the optical PCB. By controlling the power provided to the heating elements, their temperature can be controlled, and a suitable temperature gradient can be generated across the waveguide such as to induce the desired transversal refractive index gradient.

Another example of a type of such an element is an electrode of suitable geometry to create a graded change in electric field density across the waveguide cross-sections causing a proportional change in refractive index gradient. This would be applicable to electro-optical polymers which change their refractive index in response to an electric field. This would also be applicable in LiNbO3 fibres or waveguides, which change their refractive index linearly in response to an electric field due to the Pockels Effect.

Thus, as described, means and methods are provided by which the transversal refractive index of a waveguide can be perturbed as required. This enables the transverse refractive index profile of a waveguide to be varied so as to counteract the effect of a bend transition in a waveguide on the modes of a propagating optical signal.

Embodiments of the present invention have been described with particular reference to the examples illustrated. However, it will be appreciated that variations and modifications may be made to the examples described within the scope of the present invention.

ANNEX TO DESCRIPTION

Mathematical Description of Required Index Gradients

The concept of conformal transformation of a cylindrically curved waveguide to an equivalent straight waveguide with a skewed refractive index profile is hereby utilised. A background to and explanation of these concepts is hereby provided for reference.

Complex Functions

As is well known, a complex function is a function in which the independent variable (the original variable on which the function will be applied) and the dependent variable (the variable which results from the function being applied to the independent variable) are both complex numbers. The independent and dependent variables can be split into real and imaginary parts as follows:

Independent variable $z=x+iy$

Dependent variable $w=f(z)=u(x,y)+iv(x,y)$ where the variables u and v are themselves real valued functions of x and y.

Conformal Transformations

Figure 23:
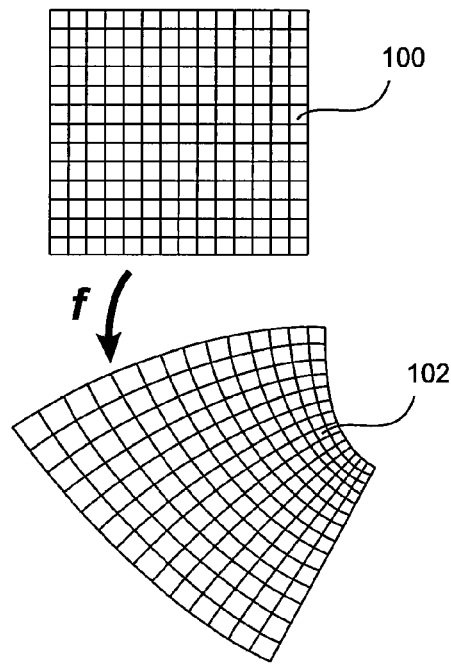
FIGS. 23 and 24 show examples of a conformal transformation.

A conformal transformation, also called a conformal mapping, conformal map, angle-preserving transformation or biholomorphic map, is defined as a transformation function, which preserves local angles. In other words it is a function, which when applied to a complex plane transforms it into another complex plane in which the angles between infinitesimal features are preserved. FIG. 23 shows schematically a plane that has undergone such a transformation (f) from its original form 100 to its transformed form 102.

Figure 24:
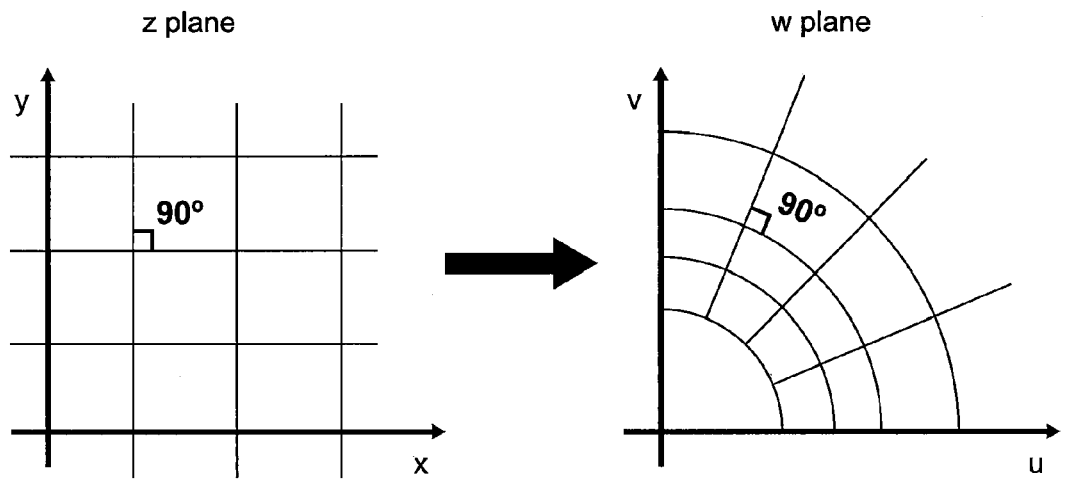

Furthermore, FIG. 24 shows a grid in the plane $z=x+iy$ transformed by the function $f(z)=e^z$ to a circular grid in the transformed plane $w=u+iv$. The 90° angles between the orthogonal grid lines in the z plane are preserved in the w plane.

Conformal Transformation of a Cylindrically Curved Waveguide Segment to an Equivalent Straight Waveguide If a conformal transformation can be identified that converts circular boundaries to flat ones, then one can apply this function f(z) to convert a circularly curved waveguide in a plane $z=x+iv$ into an equivalent straight waveguide in a plane $w=u+iv$.

Figure 25:
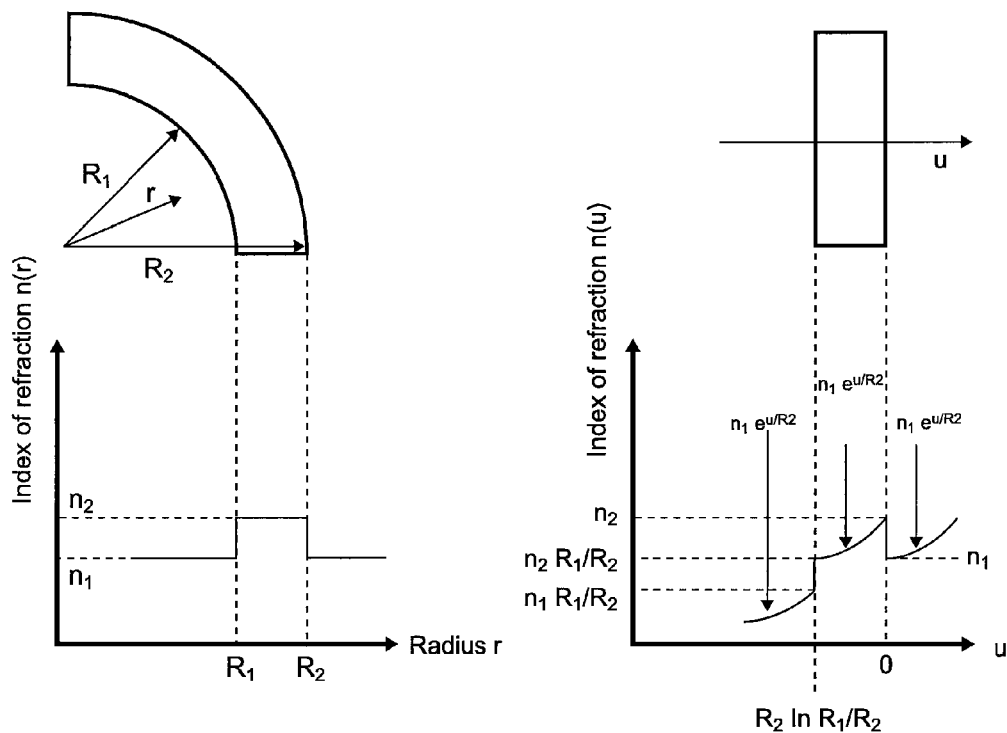
FIG. 25 is a schematic representation of the equivalence between a cylindrically curved waveguide with a conventional step-index profile and a straight waveguide with an asymmetric refractive index profile.

Heiblum (referred to above) found that a circular waveguide in the z plane could be transformed into a straight waveguide in the transformed w plane by the following conformal transformation:

$$w = R_T \ln\left(\frac{z}{R_T}\right). \qquad \text{Equation 9}$$

where $R_T$=radius of the outer core edge of the waveguide bend in the given segment for which this perturbation is calculated $z=x+iy$ $w=u+iv$ The effect of this transformation is shown schematically in FIG. 25.

The expression can be simplified to describe the effective waveguide width u in the transformed plane as function of the radius r of the cylindrical waveguide in the original plane:

$$u = R_T \ln\left(\frac{r}{R_T}\right). \qquad \text{Equation 10}$$

The effective index in the transformed plane is the refractive index in the appropriate section of waveguide (e.g. core or cladding) in the original plane multiplied by $$\left|\frac{dz}{dw}\right| = e^{\left(\frac{u}{R_T}\right)}.$$

$$n_e = n_o \cdot e^{\left(\frac{u}{R_T}\right)}. \qquad \text{Equation 11}$$

Where $n_e$ is the effective index in the transformed w plane and $n_o$ is the original refractive index in the appropriate region of the original z plane.

In order to obtain the required index perturbation in the original plane (curved waveguide), we need to multiply the effective index $n_e$ by a factor P which turns it back into the original index $n_o$.

$$P(r) = e^{-\left(\frac{u}{R_T}\right)}. \qquad \text{Equation 12}$$

If Equation 10 is then substituted into Equation 12 the correction factor in terms of radius of the cylindrical waveguide in the original plane is obtained:

$$P(r) = \frac{R_T}{r}. \qquad \text{Equation 13}$$

Therefore in order to eliminate bend loss due to modal mismatch in cylindrically bent waveguides one must apply a perturbed refractive index profile $n_p$:

$$n_p(r) = P(r) \cdot n_o = \frac{R_T}{r} \cdot n_o. \qquad \text{Equation 14}$$

where r is the radial distance from the origin of the cylindrically curved waveguide at which the perturbed refractive index is calculated and $R_T$ is the constant value for the radius of the outer core edge of the waveguide bend.

Alternatively it may be more convenient to define the perturbed index in terms of x rather than r, where x is the x-axis coordinate where the x-axis lies along the width of the waveguide as in FIGS. 10A, 10B and 10C.

The conversion from r to x is not complicated, but depends on where the user chooses to define the origin of x, at which $x=0$.

If as in FIGS. 10A, 10B and 10C, the origin of x is chosen to be the left edge of the waveguide core, then:

$$r=R_T-w+x \qquad \text{Equation 15.}$$

where:

x is the x-coordinate along the width of the core with its origin at the left core edge, and w is the waveguide core width Subsequently:

$$P(x) = \frac{R_T}{R_T - w + x}.$$

Equation 16

And thus:

$$n_p(x) = P(x) \cdot n_o = \frac{R_T}{R_T - w + x} \cdot n_o.$$

Equation 17 where:
 w is the waveguide core width and
 x is the x-coordinate along the width of the core with its origin at the left core edge at which the perturbed refractive index is calculated.

If however the origin of x is chosen to be at the centre of the waveguide core, then:

$$r = R_T - \frac{w}{2} + x.$$

Equation 18 where:
 x is the x-coordinate along the width of the core with its origin at the core centre, and w is the waveguide core width Subsequently:

$$P(x) = \frac{R_T}{R_T - \frac{w}{2} + x}.$$

Equation 19

And thus:

$$n_p(x) = P(x) \cdot n_o = \frac{R_T}{R_T - \frac{w}{2} + x} \cdot n_o.$$

Equation 20 where:
 w is the waveguide core width and
 x is the x-coordinate along the width of the core with its origin at the core centre at which the perturbed refractive index is calculated.

In the general case for an arbitrary user chosen origin of x $$r = R_T + x_{ro} + x$$

Equation 21.

where:
 $x_{ro}$ is the x-origin coordinate relative to the outer core bend edge,
 x is the x-coordinate along the width of the core with its origin at $x_{ro}$,
 and w is the constant for the waveguide core width Subsequently:

$$P(x) = \frac{R_T}{R_T + x_{ro} + x}.$$

Equation 22

And thus:

$$n_p(x) = P(x) \cdot n_o = \frac{R_T}{R_T + x_{ro} + x} \cdot n_o.$$

Equation 23 where:
 $x_{ro}$ is the x-origin coordinate relative to the outer core bend edge,
 x is the x-coordinate along the width of the core with its origin at x, at which the perturbed refractive index is calculated and
 w is the waveguide core width.

To account for the very general case for a bend in an arbitrary waveguide (including an optical fibre), which may not be fixed to the plane of a supporting substrate, such as a PCB, but may be free to bend in any arbitrary direction, the x-axis lies in the plane of the bend in question:

$$n_p(x) = P(x) \cdot n_o = \frac{R_T}{R_T + x_{ro} + x} \cdot n_o.$$

Equation 24 where:
 x-axis lies in the plane of the bend,
 $x_{ro}$ is the x-origin coordinate relative to the outer core bend edge,
 x is the x-coordinate along the width of the core with its origin at $x_{ro}$ at which the perturbed refractive index is calculated and
 w is the waveguide core width Example for Rectangular Step-Index Waveguides Step-index waveguides are characterised by a core region defined by a constant value of refractive index $n_{core}$ and a cladding region defined by a constant value of refractive index $n_{cladding}$.

In a system in which the x-axis lies in the plane of the bend and the centre of the waveguide core of width w is chosen as the x-axis origin (where x=0), the refractive index profile n(x) of a rectangular step-index waveguide is defined as follows:

$$n(x) = \begin{cases} n_{core} & \text{for } x \leq \frac{w}{2} \text{ and } x \geq -\frac{w}{2} \\ n_{cladding} & \text{for } x < -\frac{w}{2} \text{ and } x > \frac{w}{2} \end{cases}.$$

Equation 25

Thus, applying Equation 20, the perturbed index profile required for a step-index waveguide is defined as follows:

$$n_p(x) = \begin{cases} \dfrac{R_T}{R_T - \frac{w}{2} + x} \cdot n_{core} & \text{for } x \leq \frac{w}{2} \text{ and } x \geq -\frac{w}{2} \\ \dfrac{R_T}{R_T - \frac{w}{2} + x} \cdot n_{cladding} & \text{for } x < -\frac{w}{2} \text{ and } x > \frac{w}{2} \end{cases}.$$

Equation 26 where:
 w is the waveguide core width,
 x is the x-coordinate along the width of the waveguide at which the perturbed refractive index is calculated, with the x-axis origin at the core centre, and
 $R_T$ is the constant value for the radius of curvature of the outer core edge of the waveguide bend.

Example for Circular Step-Index Waveguides

The refractive index profile of a circular step-index waveguide such as an optical, fibre is defined as follows:

$$n(x,y) = \begin{cases} n_{core} & \text{for } \sqrt{x^2+y^2} \leq a \\ n_{cladding} & \text{for } \sqrt{x^2+y^2} > a \end{cases} \quad \text{Equation 27}$$

where:
the origins of the x and y coordinate axes is at the centre of the core and
a is the radius of the circular core Thus, applying Equation 20, the perturbed index profile required for a circular step-index waveguide is defined as follows:

$$n_p(x,y) = \begin{cases} \dfrac{R_T}{R_T - a + x} \cdot n_{core} & \text{for } \sqrt{x^2+y^2} \leq a \\ \dfrac{R_T}{R_T - a + x} \cdot n_{cladding} & \text{for } \sqrt{x^2+y^2} > a \end{cases} \quad \text{Equation 28}$$

where:
the origin of the x and y coordinate axes is the centre of the core,
a is the radius of the circular core and
$R_T$ is the constant value for the radius of the outer core edge of the waveguide bend.

Example for Graded-Index Waveguides

Graded-index waveguides are characterised by a core region defined by a refractive index, which varies parabolically around a maximum value of refractive index $n_{core}$ at the centre of the core and a cladding region with a constant value of refractive index $n_{cladding}$.

A linearly graded index waveguide is a special case of graded index waveguide whereby the refractive index varies only along one the axis across the waveguide core, e.g. typically the parabolic index varies along the width x of the core and not over the height y of the core.

In a system in which the x-axis lies in the plane of the bend and the centre of the waveguide core of width w is chosen as the x-axis origin (where x=0), the refractive index profile n(x) of a typical rectangular linearly graded-index waveguide is defined as follows:

$$n(x) = \begin{cases} n_{core} \cdot \sqrt{1 - 2\Delta\left(\dfrac{2x}{w}\right)^2} & \text{for } x \leq \dfrac{w}{2} \text{ and } x \geq -\dfrac{w}{2} \\ n_{cladding} & \text{for } x < -\dfrac{w}{2} \text{ and } x > \dfrac{w}{2} \end{cases} \quad \text{Equation 29}$$

Where $\Delta$ is the index step defined as follows:

$$\Delta = \frac{n_{core}^2 - n_{cladding}^2}{2 \cdot n_{core}^2} \quad \text{(Equation 28)}$$

Thus, applying Equation 20, the perturbed index profile required for the rectangular linearly graded-index waveguide of Equation 29 is defined as follows:

$$n_p(x) = \begin{cases} n_{core} \cdot \dfrac{R_T}{R_T - \dfrac{w}{2} + x} \cdot \sqrt{1 - 2\Delta\left(\dfrac{2x}{w}\right)^2} & \text{for } x \leq \dfrac{w}{2} \text{ and } x \geq -\dfrac{w}{2} \\ n_{cladding} \cdot \dfrac{R_T}{R_T - \dfrac{w}{2} + x} & \text{for } x < -\dfrac{w}{2} \text{ and } x > \dfrac{w}{2} \end{cases} \quad \text{Equation 30}$$

where:
w is the waveguide core width,
x is the x-coordinate along the width of the waveguide at which the perturbed refractive index is calculated, with the x-axis origin at the core centre, and
$R_T$ is the constant value for the radius of curvature of the outer core edge of the waveguide bend.

A more general equation for a circular radially symmetric graded-index waveguide (whereby the transverse parabolic refractive index variation occurs radially from the centre of the core) such as a standard graded-index fibre would be:

$$n(x,y) = \begin{cases} n_{core} \cdot \sqrt{1 - 2\Delta\left(\dfrac{x^2+y^2}{a^2}\right)} & \text{for } \sqrt{x^2+y^2} \leq a \\ n_{cladding} & \text{for } \sqrt{x^2+y^2} > a \end{cases} \quad \text{Equation 31}$$

where:
the origin of both the x and y coordinate axes is the centre of the core,
a is the radius of the circular core and
n(x,y) is the refractive index at coordinates x and y In such a radially graded-index waveguide the required perturbation is still applied linearly in the direction of the bend. Therefore, in order to obtain the complete required perturbed transverse refractive index profile for the waveguide $n_p(x,y)$, one must apply the disclosed perturbation P(x) (Equation 19) to the refractive index profile n(x,y) in Equation 31 in the direction of the bend x, yielding:

$$n_p(x,y) = \begin{cases} n_{core} \cdot \dfrac{R_T}{R_T - a + x} \cdot \sqrt{1 - 2\Delta\left(\dfrac{x^2+y^2}{a^2}\right)} & \text{for } \sqrt{x^2+y^2} \leq a \\ n_{cladding} \cdot \dfrac{R_T}{R_T - a + x} & \text{for } \sqrt{x^2+y^2} > a \end{cases} \quad \text{Equation 32}$$

where:
the origin of both the x and y coordinate axes is the centre of the core a is the radius of the circular core and
$n_p(x,y)$ is the required perturbed refractive index at coordinates x and y.

The invention claimed is:

1. An optical waveguide having a curved section in which, in the curved section, the waveguide has an asymmetric refractive index profile, in which the refractive index varies asymmetrically across the cross-section of the waveguide in dependence on the radius of the curved section of the waveguide;

wherein the waveguide is a cylindrically curved waveguide and the refractive index for the curved section varies based on a perturbation determined in accordance with the following formula:

$$n_p = n_o \cdot \frac{R_T}{r}$$

in which
r is the radial distance from the origin of the cylindrically curved waveguide at which the perturbed refractive index is calculated;
$R_T$ is the constant value for the outer bend radius of the waveguide;
$n_p$ is the calculated perturbed refractive index; and
$n_o$ is the original unperturbed refractive index.

2. An optical waveguide according to claim 1, in which the waveguide comprises a waveguide core and a waveguide cladding and in which variation in the refractive index is only across the cross-section of the core of the waveguide.

3. An optical waveguide according to claim 1, in which the waveguide comprises a waveguide core and a waveguide cladding and in which variation in the refractive index is across the combined cross-section of the core and the cladding of the waveguide.

4. An optical waveguide according to claim 1, in which relative to an outer core edge the refractive index is increased toward the origin of the curve and decreased away from the origin of the curve.

5. An optical waveguide according to claim 1, in which a linearly varying perturbation is applied to the refractive index across the entire width of the waveguide so as to produce the asymmetric profile.

6. An optical waveguide according to claim 1, in which the waveguide is a planar waveguide provided on a support substrate, in which the curved section is an in-plane curved section.

7. An optical waveguide according to claim 1, in which the waveguide has at least one cylindrically curved section.

8. An optical waveguide according to claim 1, in which the waveguide is composed of contiguous segments, each segment being defined by a constant radius of curvature.

9. An optical waveguide according to claim 1, comprising plural continuous curved segments, each segment having a constant radius of curvature.

10. An optical waveguide according to claim 1, in which the radius of curvature changes gradually and the transverse refractive index profile along the waveguide is determined by the immediate radius of curvature in that part of the waveguide and therefore also changes gradually.

11. An optical waveguide according to claim 1, in which the waveguide is a polymer waveguide.

12. An optical waveguide according to claim 1, comprising a stressing component provided on one or both sides of the waveguide to generate stress in the waveguide and thereby provide the asymmetric variation in refractive index.

13. An optical waveguide according to claim 1, in which ionic impurities are provided in the waveguide in desired concentrations so as to provide the variation in refractive index across the waveguide cross-section in response to an electric field.

14. An optical waveguide according to claim 1, comprising at least two continuous sections forming the waveguide, each of the at least two sections having a different radius of curvature, wherein at least one of the radii of curvature is less than or equal to 10 mm.

15. An optical waveguide according to claim 1, in which the waveguide has regions of different cross-linking so as to provide the variation in refractive index across the waveguide width.

16. An optical waveguide according to claim 1, in which the refractive index varies asymmetrically across the cross-section of the waveguide radially with respect to the curve.

17. An optical waveguide according to claim 1, in which the waveguide has a refractive index profile that is a step, such that a core region has a constant value of refractive index $n_{core}$ and the cladding region has a constant value of refractive index $n_{cladding}$ in which the x-axis lies in the plane of the bend and the centre of the waveguide core of width w is chosen as the x-axis origin, the refractive index profile n(x) of the step-index waveguide being defined as follows:

$$n(x) = \begin{cases} n_{core} & \text{for } x \leq \frac{w}{2} \text{ and } x \geq -\frac{w}{2} \\ n_{cladding} & \text{for } x\pi - \frac{w}{2} \text{ and } x\phi \frac{w}{2} \end{cases}$$

and wherein the variation in the refractive index profile is defined as follows:

$$n_p(x) = \begin{cases} \dfrac{R_T}{R_T - \frac{w}{2} + x} \cdot n_{core} & \text{for } x \leq \frac{w}{2} \text{ and } x \geq -\frac{w}{2} \\ \dfrac{R_T}{R_T - \frac{w}{2} + x} \cdot n_{cladding} & \text{for } x\pi - \frac{w}{2} \text{ and } x\phi \frac{w}{2} \end{cases}$$

where:
w is the waveguide core width,
x is the x-coordinate along the width of the waveguide at which the perturbed refractive index is calculated, the x-axis origin being at the core centre, and
$R_T$ is a constant value for the radius of curvature of the outer core edge of the waveguide bend.

18. A waveguide according to claim 1, in which the waveguide has a core region defined by a refractive index, which varies parabolically around a maximum value of refractive index $n_{core}$ at the centre of the core and a cladding region with a constant value of refractive index $n_{cladding}$;
in which the x-axis lies in the plane of the bend and the centre of the waveguide core of width w is chosen as the x-axis origin, the refractive index profile n(x) being defined as follows:

$$n(x) = \begin{cases} n_{core} \cdot \sqrt{1 - 2\Delta\left(\dfrac{2x}{w}\right)^2} & \text{for } x \leq \frac{w}{2} \text{ and } x \geq -\frac{w}{2} \\ n_{cladding} & \text{for } x\pi - \frac{w}{2} \text{ and } x\phi \frac{w}{2} \end{cases}$$

in which Δ is the index step defined as follows:

$$\Delta = \frac{n_{core}^2 - n_{cladding}^2}{2 \cdot n_{core}^2}$$

such that the variation in refractive index is defined as follows:

$$n_p(x) = \begin{cases} n_{core} \cdot \dfrac{R_T}{R_T - \dfrac{w}{2} + x} \cdot \sqrt{1 - 2\Delta\left(\dfrac{2x}{w}\right)^2} & \text{for } x \le \dfrac{w}{2} \text{ and } x \ge -\dfrac{w}{2} \\ n_{cladding} \cdot \dfrac{R_T}{R_T - \dfrac{w}{2} + x} & \text{for } x\pi - \dfrac{w}{2} \text{ and } x\phi \dfrac{w}{2} \end{cases}$$

where:
w is the waveguide core width,
x is the x-coordinate along the width of the waveguide at which the perturbed refractive index is calculated, with the x-axis origin at the core centre, and
$R_T$ is the constant value for the radius of curvature of the outer core edge of the waveguide bend.

19. An optical waveguide according to claim 1, in which the waveguide has a refractive index profile that is a step, such that a core region has a constant value of refractive index $n_{core}$ and the cladding region has a constant value of refractive index $n_{cladding}$ in which the x-axis lies in the plane of the bend and the centre of the waveguide core of width w is chosen as the x-axis origin, the refractive index profile n(x) of the step-index waveguide being defined as follows:

$$n(x) = \begin{cases} n_{core} & \text{for } x \le \dfrac{w}{2} \text{ and } x \ge -\dfrac{w}{2} \\ n_{cladding} & \text{for } x\pi - \dfrac{w}{2} \text{ and } x\phi \dfrac{w}{2} \end{cases}$$

and wherein the variation in the refractive index profile is defined as follows:

$$n_p(x) = \begin{cases} \dfrac{R_T}{R_T - \dfrac{w}{2} + x} \cdot n_{core} & \text{for } x \le \dfrac{w}{2} \text{ and } x \ge -\dfrac{w}{2} \\ \dfrac{R_T}{R_T - \dfrac{w}{2} + x} \cdot n_{cladding} & \text{for } x\pi - \dfrac{w}{2} \text{ and } x\phi \dfrac{w}{2} \end{cases}$$

where:
w is the waveguide core width,
x is the x-coordinate along the width of the waveguide at which the perturbed refractive index is calculated, the x-axis origin being at the core centre, and
$R_T$ is a constant value for the radius of curvature of the outer core edge of the waveguide bend.

20. A method of making an optical waveguide comprising:
forming a waveguide on a substrate, the waveguide including at least one curved section; and
varying the refractive index profile of the waveguide asymmetrically across its width in dependence on the radius of the curve in accordance with the following equation:

$$n_p = n_o \cdot \dfrac{R_T}{r}$$

in which:
r is the radial distance from the origin of the cylindrically curved waveguide at which the perturbed refractive index is calculated;
$R_T$ is the constant value for the outer bend radius of the waveguide;
$n_p$ is the calculated perturbed refractive index; and,
$n_o$ is the original refractive index.

21. A method according to claim 20, in which the refractive index of the waveguide is varied during manufacture of the waveguide.

22. A method according to claim 21, in which the refractive index of the waveguide is varied by varying the intensity of curing radiation used to cure the optical materials forming the waveguide.

23. A method according to claim 20, in which the waveguide is formed of an electro-optical polymer and variation in the refractive index across the waveguide is achieved by applying an electric field to the waveguide to cause a corresponding change in refractive index.

24. A method according to claim 20, in which the refractive index is varied across the waveguide using in-plane mechanical strain elements.

25. A method according to claim 20, in which the refractive index is varied across the waveguide using thermal elements.

26. A method according to claim 20, in which the refractive index varies asymmetrically across the cross-section of the waveguide radially with respect to the curve.

27. An optical waveguide having a curved section in which, in the curved section, the waveguide has an asymmetric refractive index profile, in which the refractive index of the curved section varies asymmetrically across the cross-section of the waveguide in dependence on the radius of the curved section of the waveguide;
wherein the refractive index of the curved section varies based on a perturbation determined in accordance with the following formula:

$$n_p(x) = P(x) \cdot n_o = \dfrac{R_T}{R_T + x_{ro} + x} \cdot n_o$$

in which the x-axis lies in the plane of the bend;
$x_{ro}$ is the x-origin coordinate relative to the outer core bend edge;
x is the x-coordinate along the width of the core with its origin at $x_{ro}$ at which the perturbed refractive index is calculated; and
w is the waveguide core width.

28. An optical waveguide according to claim 27, in which the waveguide comprises a waveguide core and a waveguide cladding and in which variation in the refractive index is across the combined cross-section of the core and the cladding of the waveguide.

29. An optical waveguide according to claim 27, in which relative to an outer core edge the refractive index is increased toward the origin of the curve and decreased away from the origin of the curve.

30. An optical waveguide according to claim 27, in which a linearly varying perturbation is applied to the refractive index across the entire width of the waveguide so as to produce the asymmetric profile.

31. An optical waveguide according to claim 27, in which the waveguide is a planar waveguide provided on a support substrate, in which the curved section is an in-plane curved section.

32. An optical waveguide according claim 27, in which the waveguide is composed of contiguous segments, each segment being defined by a constant radius of curvature.

33. An optical waveguide according to claim 27, comprising plural continuous curved segments, each segment having a constant radius of curvature.

34. An optical waveguide according to claim 27, in which the waveguide is a polymer waveguide.

35. An optical waveguide according to claim 27, in which the waveguide has regions of different cross-linking so as to provide the variation in refractive index across the waveguide width.

36. An optical waveguide according to claim 27, in which the refractive index varies asymmetrically across the cross-section of the waveguide radially with respect to the curve.

37. A method of making an optical waveguide comprising:
    forming a waveguide on a substrate, the waveguide including at least one curved section; and
    varying the refractive index profile of the waveguide asymmetrically across its width in dependence on the radius of the curve in accordance with the following formula:

$$n_p(x) = P(x) \cdot n_o = \frac{R_T}{R_T + x_{ro} + x} \cdot n_o$$

in which the x-axis lies in the plane of the bend, and
$x_{ro}$ is the x-origin coordinate relative to the outer core bend edge,
x is the x-coordinate along the width of the core with its origin at $x_{ro}$ at which the perturbed refractive index is calculated and
w is the waveguide core width.

38. A method according to claim 37, in which the refractive index of the waveguide is varied during manufacture of the waveguide.

39. A method according to claim 38, in which the refractive index of the waveguide is varied by varying the intensity of curing radiation used to cure the optical materials forming the waveguide.

40. A method according to claim 37, in which the refractive index varies asymmetrically across the cross-section of the waveguide radially with respect to the curve.

41. An optical waveguide having a curved section in which, in the curved section, the waveguide has an asymmetric refractive index profile, in which the refractive index varies asymmetrically across the cross-section of the waveguide in dependence on the radius of the curved section of the waveguide;
    in which the waveguide has a refractive index profile that is a step, such that a core region has a constant value of refractive index $n_{core}$ and the cladding region has a constant value of refractive index $n_{cladding}$ in which the x-axis lies in the plane of the bend and the centre of the waveguide core of width w is chosen as the x-axis origin, the refractive index profile n(x) of the step-index waveguide being defined as follows:

$$n(x) = \begin{cases} n_{core} & \text{for } x \leq \frac{w}{2} \text{ and } x \geq -\frac{w}{2} \\ n_{cladding} & \text{for } x\pi - \frac{w}{2} \text{ and } x\phi \frac{w}{2} \end{cases}$$

and wherein the variation in the refractive index profile is defined as follows:

$$n_p(x) = \begin{cases} \dfrac{R_T}{R_T - \frac{w}{2} + x} \cdot n_{core} & \text{for } x \leq \frac{w}{2} \text{ and } x \geq -\frac{w}{2} \\ \dfrac{R_T}{R_T - \frac{w}{2} + x} \cdot n_{cladding} & \text{for } x\pi - \frac{w}{2} \text{ and } x\phi \frac{w}{2} \end{cases}$$

where:
    w is the waveguide core width,
    x is the x-coordinate along the width of the waveguide at which the perturbed refractive index is calculated, the x-axis origin being at the core centre, and
$R_T$ is a constant value for the radius of curvature of the outer core edge of the waveguide bend.

* * * * *